(12) United States Patent
Anan et al.

(10) Patent No.: US 6,795,275 B2
(45) Date of Patent: Sep. 21, 2004

(54) MAGNETIC DISK DEVICE AND MAGNETIC HEAD SLIDER

(75) Inventors: Hidetoshi Anan, Yokohama (JP);
Tetsuya Matsusaki, Odawara (JP);
Hidekazu Kohira, Ninomiya (JP);
Yoshihiro Shiroishi, Hachioji (JP);
Masaaki Matsumoto, Fujisawa (JP);
Hideaki Tanaka, Odawara (JP);
Teruyoshi Higashiya, Ninomiya (JP);
Kiyoshi Hashimoto, Odawara (JP);
Akira Matsuda, Odawara (JP);
Takanori Yamazaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/330,368

(22) Filed: Dec. 30, 2002

(65) Prior Publication Data

US 2003/0133227 A1 Jul. 17, 2003

Related U.S. Application Data

(63) Continuation-in-part of application No. 09/761,734, filed on Jan. 18, 2001, now Pat. No. 6,556,381.

(30) Foreign Application Priority Data

Feb. 26, 2002 (JP) ........................................ 2002-048935
Sep. 5, 2002 (JP) ........................................ 2002-259523

(51) Int. Cl.[7] .............................................. G11B 5/60
(52) U.S. Cl. ................................ 360/235.7; 360/235.8; 360/236.3; 360/235.1
(58) Field of Search ......................... 360/235.7, 235.6, 360/236.3, 235.8, 235.1

(56) References Cited

U.S. PATENT DOCUMENTS

| | | | | | |
|---|---|---|---|---|---|
| 5,404,256 | A | * | 4/1995 | White | 360/236.3 |
| 6,144,529 | A | * | 11/2000 | Wada et al. | 360/236.1 |
| 6,351,345 | B1 | * | 2/2002 | Kameyama | 360/236.3 |
| 6,396,664 | B2 | * | 5/2002 | Koishi et al. | 360/235.8 |
| 6,424,494 | B1 | * | 7/2002 | Koishi | 360/235.6 |
| 6,462,909 | B1 | * | 10/2002 | Boutaghou et al. | 360/235.8 |
| 6,525,909 | B1 | * | 2/2003 | Qian et al. | 360/235.7 |
| 6,556,381 | B2 | * | 4/2003 | Kohira et al. | 360/236.3 |
| 6,657,820 | B2 | * | 12/2003 | Kohira et al. | 360/236.3 |

FOREIGN PATENT DOCUMENTS

| | | |
|---|---|---|
| JP | 63-057724 | 3/1988 |
| JP | 1-297421 | 11/1989 |

* cited by examiner

*Primary Examiner*—Robert S. Tupper
(74) *Attorney, Agent, or Firm*—Antonelli, Terry, Stout & Kraus, LLP

(57) ABSTRACT

A magnetic disk device, which is provided with a magnetic head slider mounted with a magnetic head and a magnetic disk, and of which the magnetic head slider has the possibility of contacting the magnetic disk at the vicinity of the magnetic head. The magnetic head slider has the size of 1.25 mm or less in length, 1 mm or less in width and 0.3 mm or less in thickness, and the friction force exerted between the magnetic head slider and the magnetic disk is 10 mN or less. The magnetic head comprises four substantially parallel surfaces and the depth from a first surface which is the most adjacent surface to the magnetic disk to a second surface is 10 nm to 50 nm, the depth from the second surface to a third surface is 50 nm to 200 nm, and the depth from the third surface to a fourth surface is 400 nm to 1 μm.

6 Claims, 25 Drawing Sheets

MAGNETIC DISK DEVICE AND MAGNETIC HEAD SLIDER

This is a continuation-in-part of U.S. application Ser. No. 09/761,734, filed Jan. 18, 2001, now U.S. Pat. No. 6,556,381 the subject matter of which is incorporated by reference herein and is related to U.S. application Ser. No. 10/420,715 and 10/420,904, filed Apr. 23, 2003. which are continuations of U.S. application Ser. No. 09/761,734, and U.S. application Ser. No. 10/199,200. filed Jul. 19, 2002.

BACKGROUND OF THE INVENTION

This invention relates to a magnetic disk device, particularly to the structure of a magnetic head slider and a magnetic disk in a contact recording magnetic disk device in which the magnetic head slider touches the magnetic disk.

To increase the recording density of the magnetic disk device, the narrowing of flying height, that is defined as the spacing between a magnetic head slider mounted with a magnetic head and a rotating magnetic disk, is important.

The uniform flying height over the all surface of the magnetic disk is also required. Further, the fluctuation of flying height by an environmental variation, especially the decrease of flying height by the drop of atmospheric pressure in the high altitude is required to be minimized.

In proportion to the decrease of the flying height, the possibility of the contact of the magnetic head slider with the magnetic disk increases, and if the contacting state is severe, the magnetic head slider crashes against the magnetic disk and there is the possibility of destroying the recorded data on the magnetic disk.

As a conventional technology for generally equalizing the flying height over the all surface of the magnetic disk, reducing the decrease of flying height and keeping the uniform flying height all over the magnetic disk in the high altitude, a technology is disclosed by JP-A-2000-57724.

Said Japanese publication discloses a step air bearing sub-ambient pressure force magnetic head slider which generally equalizes the flying height over the all surface of the magnetic disk and enabling to reduce the decrease of the flying height in the high altitude by the adequate combination of a step air bearing having the recess of the depth of sub-microns, the recess deeper than that of the air bearing for generating sub-ambient pressure force and the rail surfaces.

SUMMARY OF THE INVENTION

A first thing to do to increase the recording density of magnetic disk device while keeping the high reliability of it is to devise the measures of preventing the contact between the magnetic head slider and the magnetic disk by narrowing and equalizing the flying height over the all surface of the magnetic disk, reducing the fluctuation of the flying height caused by the variation of the manufacturing of the magnetic head slider, reducing the fluctuation of flying height by seek operations, and reducing the decrease of flying height in the high altitude.

However, whatever measures are taken with above described effects, the contact between the magnetic head slider and the magnetic disk is unavoidable with the narrow flying height of 15 nm or less and the vibration or the wear of the magnetic head slider are becoming a new problem.

Regarding to the step air bearing sub-ambient pressure force magnetic head slider disclosed by said JP-A-2000-57724, it is disclosed that the flying height is generally uniform, and the fluctuations of the flying height by the variation of the manufacturing, seek operations and in the high altitude can be reduced.

However, it gives no considerations especially to the vibration of magnetic head slider caused by the contact with the magnetic disk and improvement on this point has been requested.

Further, to reduce fluctuations in the flying height due to variations in manufacturing, it is necessary for manufacturing at high accuracy even when the depth is reduced by the formation of a surface such as a slider rail surface. For example, in a case when the depth of 400 nm is fabricated at ±10% accuracy, a tolerable variation is ±40 nm, whereas this is ±1 nm for the depth of 10 nm. A depth of 10 nm or less cannot be fabricated at an accuracy of about ±1 nm by the existent fabrication such as ion milling and an improvement has been demanded in this regard.

The present invention relates to the above described needs and intends to provide the magnetic disk device and the magnetic head slider that are generally uniform with the flying height over the all surface of the magnetic disk, reduced with the fluctuations of flying height by the variation of the manufacturing, seek operations and in the high altitude, and in case of the contact between the magnetic head slider and the magnetic disk, the magnetic head slider slides on the surface of the magnetic disk smoothly maintaining a high reliability.

Further, the present invention intends to provide a magnetic head slider with less variation in the depth even in a case where the depth is reduced as shallow as 10 nm or less due to the formation of a surface such as a slider rail surface.

To solve above described problems, the present invention adopts the following constitution.

A magnetic head slider comprising a magnetic head mounting surface on the air flow-out side which is the closest to the magnetic disk in operation and mounted with the magnetic head, a slider rail surface which is separated from said magnetic head mounting surface and formed with the surface near to air flow-in side and both side surfaces near the air flow-in edge having the depth of 10 nm to 50 nm from the magnetic head mounted surface, a slider step air bearing surface formed surrounding said slider rail surface and has the depth of 50 nm to 200 nm from said slider rail surface, and a recess for generating sub-ambient pressure force surrounding said slider step air bearing surface and having the depth of 400 nm to 1.3 μm from said slider step air bearing surface.

Further, the present invention intends to provide a magnetic head slider comprising a magnetic head mounting surface on the air flow-out side which is closest to the magnetic disk in operation and provided with the magnetic head, a protective film of 10 nm or less comprising one or more layers of films at least formed on the magnetic head mounting surface, a slider rail surface formed with the surface near to air flow-in side and the surface near to air flow-out side, a step air bearing surface having a depth of about 50 nm to 200 nm from the surface of the slider rail surface at least on the air flow-in side, and a recess for generating sub-ambient pressure force surrounding the slider step air bearing surface and having a depth of 400 nm to 1.3 μm, in which the surface near the air flow-out side surface in the slider rail has a depth equal to a thickness of one or more layers of the protective film from the surface of the protective film comprising one or more layers of films.

A magnetic disk device is provided with the magnetic head slider mounted with the magnetic head and the magnetic disk that is a data recording medium, wherein the vicinity of said magnetic head of said magnetic head slider has the possibility of contacting said magnetic disk, said magnetic head slider has the length of 1.25 mm or less, the width of 1 mm or less and the thickness of 0.3 mm or less, and the friction force exerted between said magnetic head slider and said magnetic disk is 10 mN or less.

A magnetic disk device is provided with the magnetic head slider having the magnetic head and the magnetic disk that is the data recording medium, wherein the vicinity of said magnetic head of said magnetic head slider has the possibility of contacting said magnetic disk, the floating pitch angle of said magnetic head slider is 50 micro-radian or more, the mean surface roughness Ra of said magnetic disk is 2 nm or less and the peak count of it is 700/400 $\mu m2$ or more.

BRIEF DESCRIPTION OF THE DRAWINGS

FIGS. 27A–28D are drawings for illustrating manufacturing steps of the magnetic head slider in the eighth preferred embodiment of the present invention.

FIGS. 28A–28G are drawings for illustrating manufacturing steps of the magnetic head slider in the eighth preferred embodiment of the present invention.

DESCRIPTION OF THE PREFERRED EMBODIMENTS

Following is the description of the magnetic head slider and the magnetic disk device therewith of the preferred embodiment of the present invention referring to drawings.

Figure 1:
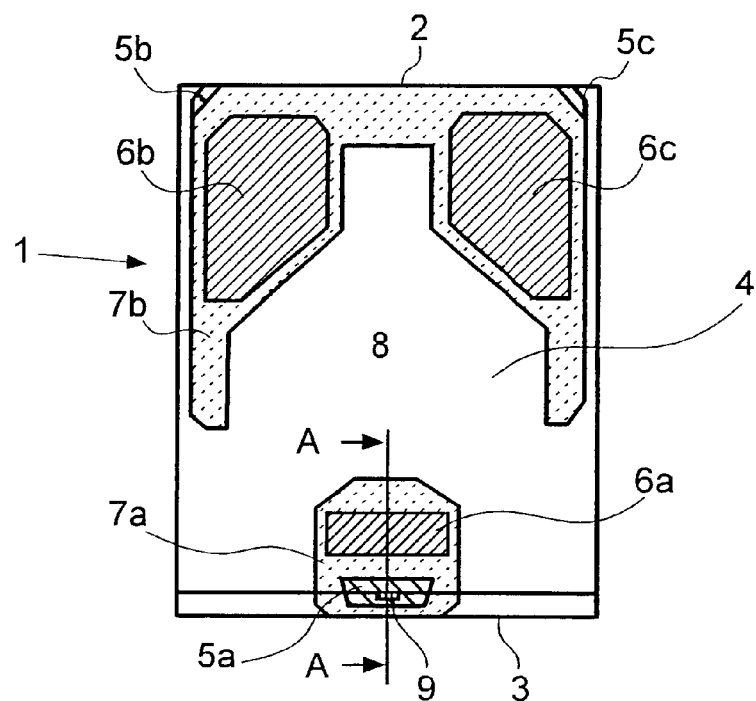
FIG. 1 is the top view of the magnetic head slider of the first preferred embodiment of the present invention.
Figure 2:
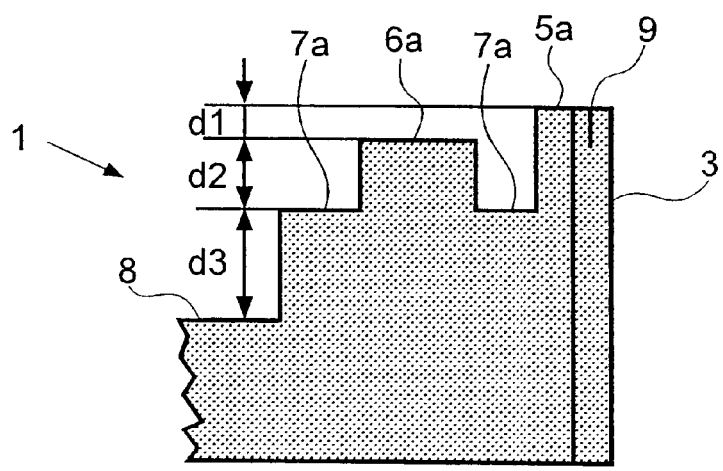
FIG. 2 is the figure showing the A—A cross section in the direction of arrows in the FIG. 1.

FIG. 1 is a top view of the magnetic head slider of the first preferred embodiment of the present invention. FIG. 2 is the A—A cross section in the direction of arrows in FIG. 1.

As is shown by a figure, the magnetic head slider 1 of the first preferred embodiment of the present invention constitutes provided with an air flow-in edge 2, an air flow-out edge 3 and a floating surface 4.

Said floating surface 4, facing a magnetic disk which is not shown, is provided with first surface constituting elements 5a, 5b and 5c, which form the first surface most adjacently positioned to the magnetic disk, second surface constituting elements 6a, 6b and 6c, which form the second surface more separated from the magnetic disk than the first surface, third surface constituting elements 7a, 7b and 7c, which form the third surface more separated from the magnetic head than the second surface, and fourth surface constituting elements 8 which forms the fourth surface most separated from the magnetic disk.

The first to the fourth surfaces are substantially parallel, the depth d1 from the first surface constituting element 5a to the second surface constituting element 6a is 30 nm, the depth d2 from the second surface constituting element 6a to the third surface constituting element 7a is 120 nm and the depth from the third surface constituting element 7a to the fourth surface constituting element 8 is 800 nm.

The magnetic head slider 1 has the length of 1.25 mm, the width of 1.0 mm and the thickness of 0.3 mm. The first surface constituting element 5a is provided with a magnetic head 9.

The magnetic head 9 comprises a recording inductive head and a reproducing GMR (Giant Magneto-Resistance) head.

The recording gap of the inductive head and the reproducing gap of GMR are formed on a surface which is substantially the same surface with the first surface constituting element 5a.

The gap means either the recording gap or the reproducing gap hereafter.

Here, the substantially same surface means that, as the hardness is different among the base material (generally AlTiC) constituting the magnetic head slider 1, the constituting member of the magnetic head 9 and the protecting member (generally alumina) of the magnetic head, the softer magnetic head is more abraded in lapping work forming the difference in level of several nanometers. This difference of the level is not intentionally formed and clearly different from the other surfaces that are intentionally formed.

In this preferred embodiment of the invention, a surface provided with the magnetic head 9 is defined as the first surface but a protruding surface for the purpose of preventing sticking at the contact stop of the magnetic head on the magnetic disk can be formed on the closer side to the magnetic disk than the first surface.

Figure 3:
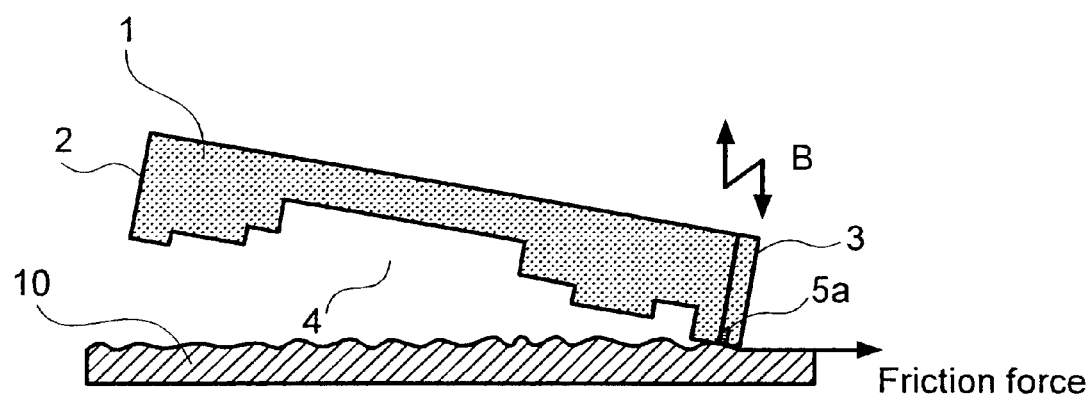
FIG. 3 is the figure illustrating the contacting state between the magnetic head slider and the magnetic disk facing therewith in the first preferred embodiment of the present invention.

FIG. 3 is a figure illustrating the relative positions of a magnetic head slider 1 and a magnetic disk 10 of the above-described first preferred embodiment of the present invention operating inside the magnetic disk device.

When airflow generated by the rotation of the magnetic disk 10 enters between the magnetic head slider 1 and the magnetic disk 10, pressure is generated between the second surface constituting elements 6a, 6b and 6c, and the magnetic disk 10, then the magnetic head slider 1 begins to float being taken off from the magnetic disk 10.

In this preferred embodiment of the present invention, the second surface constituting elements 6a, 6b and 6c correspond to the rail surfaces of the conventional magnetic head slider having been widely used.

The magnetic head slider 1 is generally designed to float in such attitude that the flying height on the side of the air flow-in edge 2 is larger than the flying height on the side of the air flow-out edge. Therefore, the air flow-out edge side approaches most adjacently to the magnetic disk 10.

In the magnetic head slider of the first preferred embodiment of the present invention, the first surface constituting element 5a approaches most adjacently to the magnetic disk 10 and in case the magnetic head slider 1 contacts the magnetic disk 10, the contact occurs at the first surface constituting element 5a. Friction force is exerted to the contacting surface. The depth d1 from the first surface constituting element 5a to the second surface constituting element 6a is 30 nm and the depth d1 can limit the contacting surface between the magnetic head slider 1 and the magnetic disk 10 to the first surface constituting element 5a.

Mounting the magnetic head 9 on the first surface constituting element 5a, the magnetic head 9 approaches the magnetic disk 10 to the closest and the recording density can be improved.

The third surface constituting elements 7a and 7b are structured surrounding the second surface constituting elements 6a, 6b and 6c.

The airflow, having entered between the magnetic head slider 1 and the magnetic disk 10, is compressed by the third surface constituting elements 7a and 7b, and then enters the second surface constituting elements 6a, 6b and 6c.

The third surface constituting elements 7a and 7b corresponds to the step air bearing surface or the tapered surface of the magnetic head that has been widely used.

The depth d2 from the second surface constituting element to the third surface constituting element is very important parameter to equalize the flying height over the all surface of the magnetic disk. This will be described afterward.

The fourth surface constituting element 8 is surrounded by the third surface constituting element 7b and sub-ambient pressure force is generated at the fourth surface constituting element 8 (this sub-ambient pressure force exerts the slider to approach the magnetic disk).

That is, the fourth surface constituting element 8 corresponds to the recess for generating sub-ambient pressure force of the conventional magnetic head that has been widely used.

The depth d3 from the third surface constituting element 7a to the fourth surface constituting element 8 is very important to reduce the decrease of flying height caused by the atmospheric pressure drop in the high altitude and this will be described afterward.

Figure 4:
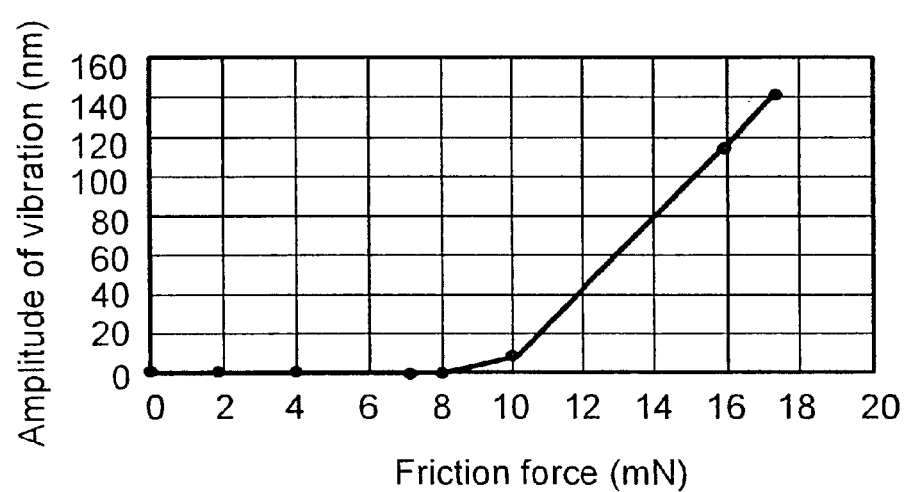
FIG. 4 is a diagram showing the relation between the friction force generated by the contact between the magnetic head slider and the magnetic disk, and the amplitude of vibration in the first preferred embodiment of the present invention.

FIG. 4 shows the relation between the friction force acting between the first surface constituting element 5a of the magnetic head slider 1 and the magnetic disk 10, and the vibration displacement,(FIG. 3, in the direction of arrow B) of the magnetic head slider 1 in the first preferred embodiment of the present invention.

The friction force is measured by a friction sensor comprising a pair of parallel leaf springs and a strain gauge.

For measuring the friction force with the actual magnetic disk device, for example, the friction force can be obtained indirectly by measuring the rotational torque of a spindle motor.

For measuring the vibration displacement of the magnetic head slider 1, the velocity variation of the magnetic head slider 1 caused by the contact in the direction of the arrow B is measured by a laser doppler vibrometer.

The laser doppler vibrometer, model OFV2700 made by Polytec PI Inc. was used with the sampling frequency of 4 MHz.

To remove the influence of the run-out frequency of the magnetic disk and the resonant frequency of the suspension, we treat high-pass filtering process of 40 KHz to the data measured by the laser doppler vibrometer.

After the above data processing, the vibration displacement waveform is obtained by integrating the, velocity data with time.

The vibration amplitude shown by FIG. 4 indicates the value of the standard deviation of the vibration displacement waveform after the above signal processing.

For measuring the vibration displacement by contact with the actual magnetic disk device, for example, there is a method of measuring it from the read waveform of the magnetic head 9.

When the vibration displacement is larger, jitter that is affected by the vibration in the direction of bits (peripheral direction) and off-track affected by the vibration in the direction of the track width will become more conspicuous, and the bit error rate of the magnetic disk device will be higher as the result of it.

As is shown by FIG. 4, when the friction force is zero, that is the magnetic head slider 1 is floating on the magnetic disk 10 and does not contact the magnetic disk, the vibration of small amplitude of 0.3 nm is seen (at friction is zero on the axis of abscissa in FIG. 4).

When the flying height of the magnetic head 1 decreases further and the magnetic head 1 starts to touch the magnetic disk 10, the friction force between them increases.

Corresponding to the increase of the friction force, the vibration amplitude increases gradually.

In case the friction force increases, if the moment by the friction force around pivots (supporting points that support the slider) is smaller enough than the moment formed around the pivots by air force formed between the magnetic head slider and the magnetic disk, the magnetic head slider runs in contact on the magnetic disk stably, the increase of the vibration amplitude is smaller in spite of the contact, and according to the experimental result, the vibration amplitude is approximately 1 nm when the friction force is not more than 10 mN.

In such a range where the friction force is not more than 10 mN, the similar bit error rate can be obtained to those with the floating magnetic head.

However, when the friction force exceed 10 mN, the moment around the pivots by the friction force is equivalent to or more than the moment around the pivots by the air force, the vibration amplitude increases drastically.

In such a region of the friction force, the magnetic head 9 cannot record or reproduce data on the magnetic disk 10 and the bit error rate increases suddenly.

With the preferred embodiment of the present invention, the friction force at which the vibration amplitude increases suddenly was 10 mN but this critical friction force is considered to depend on the shape of the magnetic head slider.

The magnetic head slider 1 of the preferred embodiment of the present invention has, as above described, the shallow depth 3 of the fourth surface constituting element 8 that generates the sub-ambient pressure force that is 900 nm, and therefore, the slider having the sizes of 1.25 mm in length, 1.0 mm in width and 0.3 mm in thickness generates very large sub-ambient pressure force of 30 mN for its size.

Further, the magnetic head slider 1 contacts the magnetic disk 10 with the first surface constituting element 5a having small area and the other second, third and fourth surfaces are separated far from the magnetic disk 10, and therefore, there is a merit that the contacting surface is limited to the first surface constituting element 5a.

The magnetic head slider 1 of the preferred embodiment of the present invention comprises the structure provided with the above-described area (especially, the first surface constituting element 5a is set small) and the depth.

Considering these, when the different configuration of the magnetic head slider than the magnetic head slider 1 of the preferred embodiment of the present invention is used, the critical friction force is thought to be less than 10 mN.

This means a stable contact area is narrow and it is not desirable from the point of view of the reliability of the magnetic disk device.

Figure 5:
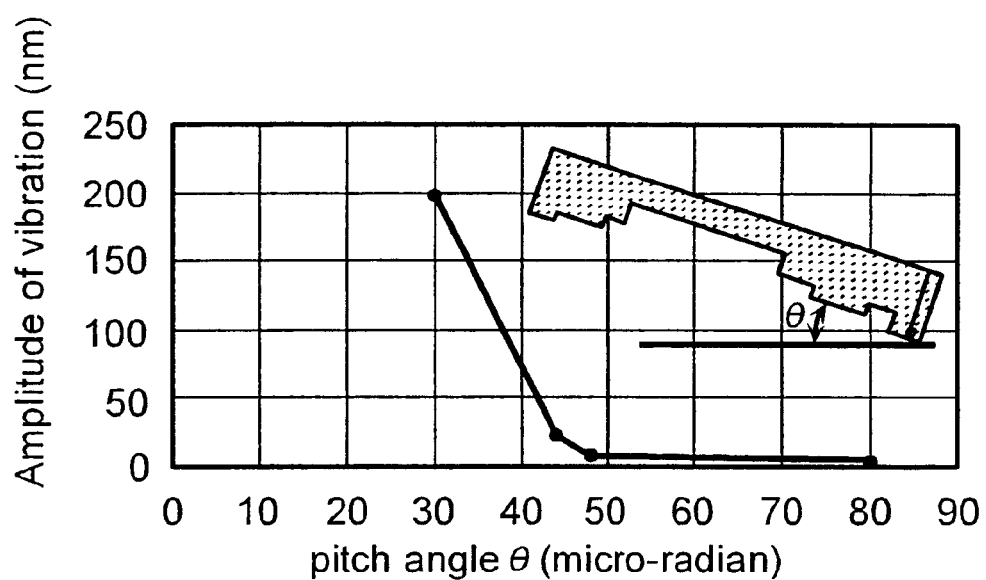
FIG. 5 is a diagram showing the relation between the pitch attitude angle of the magnetic head slider and the amplitude of vibration in the first preferred embodiment of the present invention.

FIG. 5 is a diagram showing the relation between the pitch attitude angle ? and the vibration amplitude. The pitch attitude angle is obtained from the results of the flying height measurement. The flying height is measured with a Dynamic Flying Height Tester made by Phase Mertrics, Inc.

The flying heights of the edge on the air flow-in side and the edge on the air flow-out side are measured using an ultra-smooth glass disk having mean surface roughness Ra of 0.5 nm, and the pitch attitude angle ? is obtained by the difference of the flying heights and the distance between both measuring points.

As is shown by FIG. 5, when the pitch attitude angle decreases to not more than 50 micro-radian, the vibration amplitude abruptly increases.

This means that in case the magnetic head slider begins to contact the magnetic disk at the edge on the air flow-in side, the vibration amplitude will increase abruptly.

Therefore, the pitch attitude angle must be at least 30 micro-radian or more and it is preferable for the pitch attitude angle to be 50 micro-radian or more for the standpoint of reducing the vibration amplitude.

As above described, the configuration and pitch attitude angle of the magnetic head slider 1 affect the friction force, and therefore, affects the vibration amplitude strongly.

Similarly, the surface roughness and the form of the magnetic disk 10 is measured with the scanning probe microscope of Digital Instruments, Inc. Measuring area was 20 $\mu$m×20 $\mu$m. Measuring resolution in the direction of height was 0.02 nm.

Measured data was flattening treated by a two-stage filter before the analysis.

As an index of surface roughness, adding to a generally used central surface roughness (mean surface roughness) Ra and maximum height Rp, peak counts are acquired simultaneously as the peak counts are found to affect substantially to the vibration amplitude.

The peak count is defined as the count of peaks exceeding a threshold level that is 1 nm above the centerline of the surface roughness (mean surface roughness plane).

(The peaks of the surface roughness exceeding the height of 1 nm from the mean surface roughness plane are counted).

The each of the magnetic disks used for the experiments this time is a smooth disk having the mean surface roughness Ra of 1.5 nm and the glide height of 6 nm.

The method of obtaining the glide height is as follows.

The flying height of the slider is measured beforehand as the function of velocity using a special slider provided with an Acoustic Emission (AE) sensor.

On the magnetic disk to measure the glide height, the slider is floated.

From the velocity, where the output of the AE sensor increases by the contact between the slider and the magnetic disk when the flying height is reduced by decreasing velocity gradually, the glide height can be defined by an inverse operation (a flying height acquired from the function between the flying height and the velocity).

There is a strong correlation among the mean surface roughness Ra, the maximum surface roughness height Rp and the glide height, and it is widely known that to decrease the glide height, the surface roughness must be reduced.

However, when the surface roughness is lower, the contacting surface area is larger at the contact between the magnetic head slider and the magnetic disk, and the friction force will increase resulting in the increase of the vibration amplitude.

This will adversely affects the reliability of the magnetic disk device profoundly.

To reduce the frequency of contact, the decrease of the glide height by smoothing the surface roughness will be effective, but the smoother surface will cause large vibrations when the contact happens and therefore, there is a contradictory request that surface roughness is not to be smoother.

This time, the inventors found that the difference of peak counts, that are the index of microscopic form of the surface of the magnetic disk, strongly affects the vibration amplitude at the contact with similar glide height as is described below.

Figure 6:
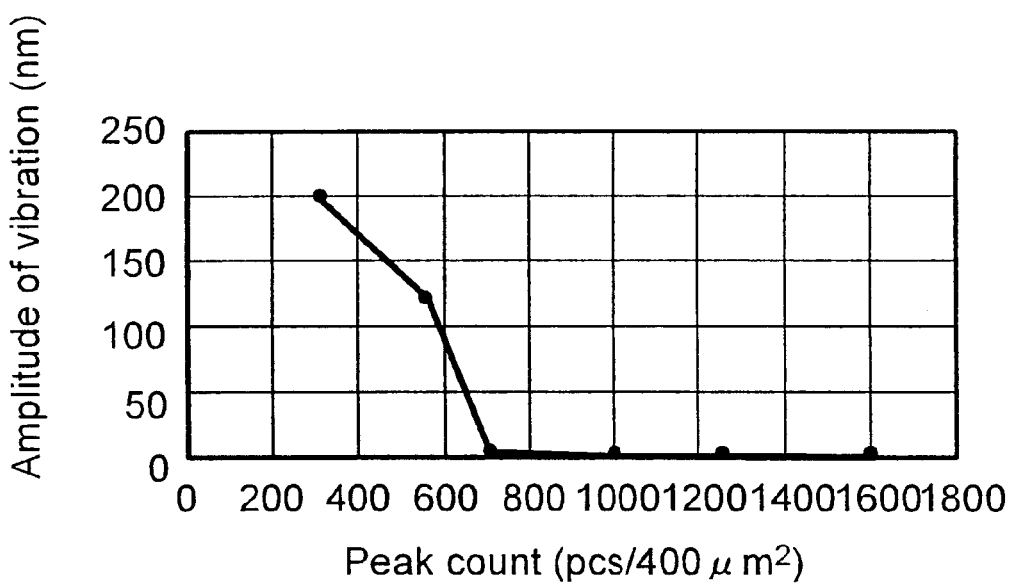
FIG. 6 is a diagram showing the relation between the peak count of the magnetic disk and the amplitude of vibration of the magnetic head slider of the first preferred embodiment of the present invention.

FIG. 6 is a diagram showing the relation between the peak count, that is the index that shows the surface form of the magnetic disk 10, and the vibration amplitude.

Disks shown in FIG. 6 are with the glide height of 6 nm. The peak counts varied from $250/400 \mu m2$ to $1600/400 \mu m2$.

As is shown by FIG. 6, the fewer the peak counts, the larger the vibration amplitude.

On the other hand, the vibration amplitude decreases with the peak count of 700 or more.

When the peak count is fewer, the peak of the surface roughness is pushed down elastically by the contact force exerted at the contact and the magnetic head slider contacts the magnetic disk surface at the mean plane of the surface roughness.

Therefore, it is considered that the vibration amplitude increases with the larger friction force by the larger contacting surface.

When the peak count exceeds a certain point, the many peaks of the surface roughness will share the contacting force, the deformation of the peaks of the surface roughness will be smaller and the increase of the contacting surface area will be prevented.

Therefore, the friction force and the vibration amplitude are smaller.

Though it could not be confirmed in the extent of the experiment this time, but it is predicted that the excessive peak count will increase the contacting area excessively and will increase the vibration amplitude.

As above described, the magnetic disk, used with the low flying height of the magnetic head slider that requires the consideration of the contact between the magnetic head slider and the magnetic disk, requires the consideration of peak counts adding to the reduction of conventional surface roughness index Ra and Rp for reducing the glide height.

In the preferred embodiment of the present invention, the peak count of $700/400 \mu m2$ or more is desirable for reducing the vibration amplitude.

Figure 7:
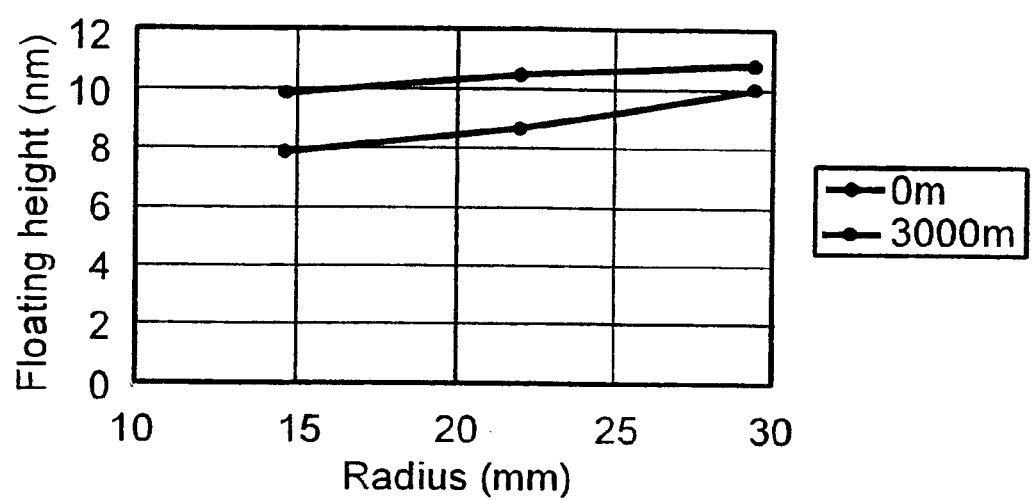
FIG. 7 is a diagram showing the floating profiles of the magnetic head slider of the first preferred embodiment of the present invention in the ground altitude and the high altitude.

FIG. 7 is the profile (calculated value) of the flying height of the magnetic head slider 1 over the whole surface of the magnetic disk at the ground altitude and the high altitude.

The calculation is with the condition of the magnetic disk with the diameter of 65 mm (generally called 2.5 inch) and the spindle rotational speed of 4200 rpm.

The average flying height at the ground altitude is approximately 10 nm and uniform floating profile is realized over the whole surface of the magnetic disk (mainly by the effect of the depth d2 shown by FIG. 2).

The decrease of the flying height at the high altitude is 2 nm at the inner circumference of the magnetic disk and 1 nm at the outer circumference, and excellent floating profile is realized at the high altitude.

In this example of calculation, the average flying height is assumed to be 10 nm, but the measured flying height of the mass-produced magnetic head slider varies caused by the variation of the manufacturing.

With the magnetic head slider of the preferred embodiment of the present invention, the variation of the flying height of ±2 nm and the decrease of the flying height of 1 nm of the magnetic head slider at seek operation are anticipated.

Assuming the use of the smooth disk of the glide height of 6 nm, the magnetic head slider of the preferred embodiment of the present invention is assumed to contact the magnetic disk at the worst condition at the high altitude.

The magnetic head slider of the preferred embodiment of the present invention is designed, as described later, to minimize the drop of the flying height at the high altitude.

As described above, sub-ambient pressure force is large so that the variation of the flying height by the variation of the manufacturing is smaller than those of the conventional cases.

Therefore, in general, when the average flying height at the ground altitude is 15 nm or less, the contact between the magnetic head slider and the magnetic disk must be considered at the worst condition.

Figure 8:
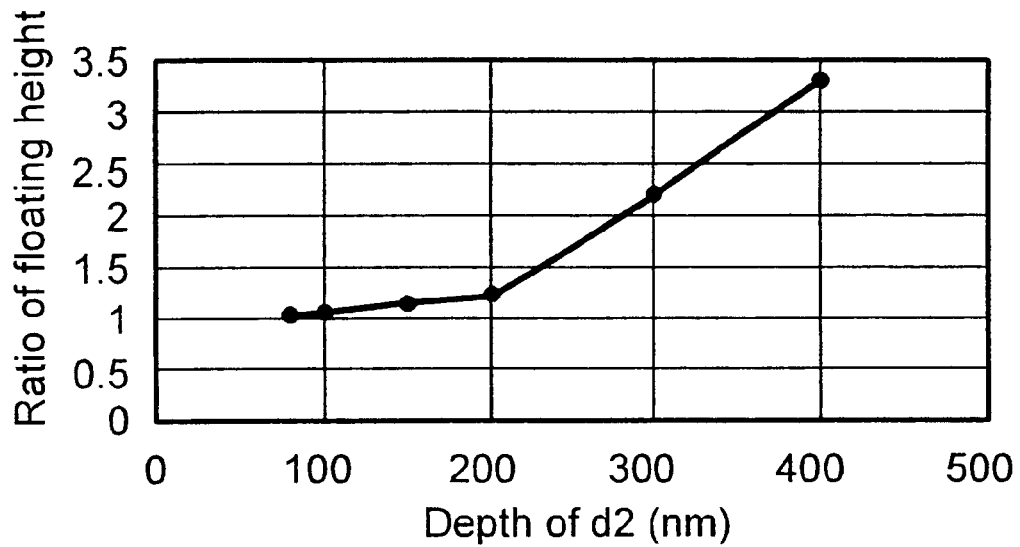
FIG. 8 is a diagram showing the relation between the depth d2 between a second surface constituting element and a third surface constituting element of the magnetic head of the first preferred embodiment of the present invention, and the ratio of flying heights.

FIG. 8 is a diagram showing the relation between the depth d2 between the second surface and the third surface of the magnetic head slider 1 and the ratio of the maximum and minimum flying height of the floating profile over the whole surface of the magnetic disk. Assumed condition is similar to that of FIG. 7.

As described above, the depth of d2 strongly affects to the uniformity of the floating profile. In an actual case, when d2 is 200 nm or more, the floating ratio exceeds 1.2 and the uniform floating profile cannot be kept anymore.

On the other hand, when d2 is extremely shallow, the floating profile will be uniform but the deviation of the flying height by the variation of the depth value of d2 will increase.

Therefore, in the preferred embodiment of the present invention, the depth d2 of 50 nm to 200 nm is preferable from the viewpoint of equalizing the floating profile and decreasing the fluctuation of the flying height.

The adequate depth of d2 for equalizing the floating profile depends on the condition of the magnetic disk device.

For example, in case of the magnetic disk device having a 95 mm diameter (generally called a 3.5 inch) magnetic disk of which spindle rotational speed is 7200 rpm, the optimum depth of d2 is 150 nm to 400 nm.

Figure 9:
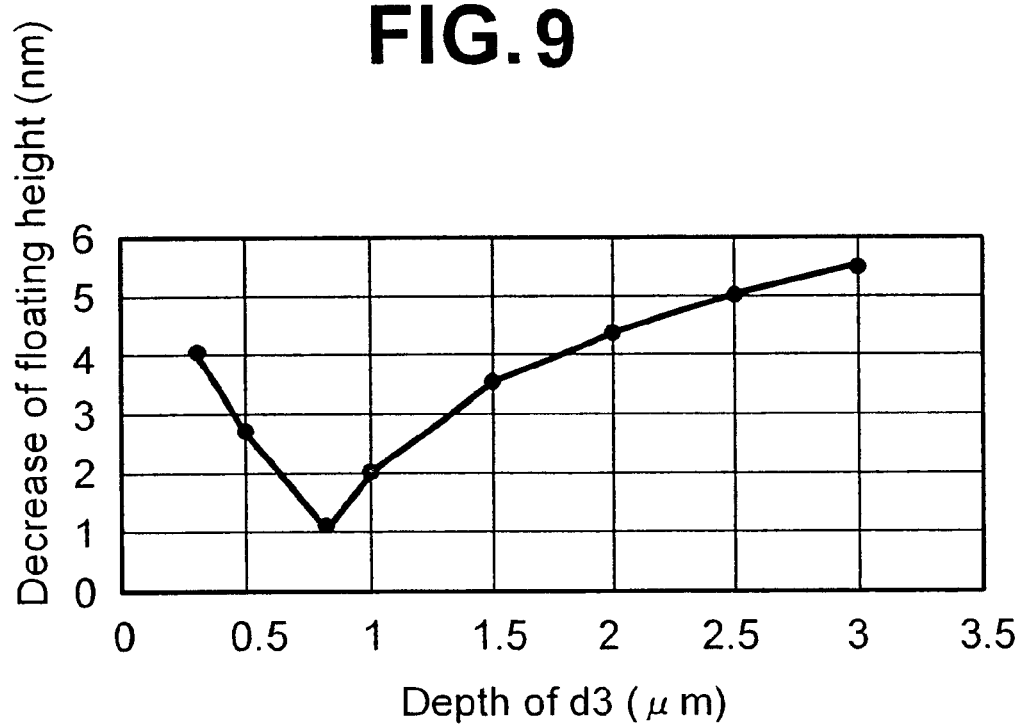
FIG. 9 is a diagram showing relation between the depth 3 between the third surface constituting element and the fourth surface constituting element of the magnetic head slider of the first preferred embodiment of the present invention, and the difference of flying heights in the ground altitude and the high altitude.

FIG. 9 is a diagram showing the relation between the depth d3 between the third surface and the fourth surface, and the decrease of the flying height at the high altitude from the flying height at the ground altitude.

Generally, the decrease of the flying height at the high altitude is more conspicuous at the inner circumference of the magnetic disk, so that the decrease of the flying height is measured at the inner circumference.

Assumed condition is similar with that of FIG. 7.

FIG. 9 shows that the decrease of the flying height is minimum at the depth d3 of 800 nm.

When d3 is larger or smaller than the value, which gives the minimum decrease of the flying height, the decrease of the flying height is larger.

In the condition of the magnetic disk device of the preferred embodiment of the present invention, the depth d3 of 400 nm to 1.3 $\mu$m is preferable.

In other words, the position of the magnetic head slider against the magnetic disk referring to FIG. 3 is held at a certain flying height of the slider by balancing between the sum of the slider suspension load W and the sub-ambient pressure force N exerted to the fourth surface having the depth d3, and the positive pressure P exerted to the slider.

If the sub-ambient pressure force does not change at the high altitude from that of the ground altitude in spite of the decrease of the positive pressure P at the high altitude, the flying height of the slider drops proportionally to the decrease of the positive pressure, but actually the sub-ambient pressure force drops at the high altitude, and if the level of the drop of the sub-ambient pressure force is similar to the level of the drop of the positive pressure, the similar floating relations is maintained both in high altitude and in ground altitude.

The depth d3, which maximize the drop of the sub-ambient pressure force to the level of the drop of the positive pressure, is 800 nm.

That is, it has the characteristic of changing the sub-ambient pressure force by the value of the depth d3.

The optimum depth of d3, which reduces the drop of the flying height at the high altitude depends on the unit condition.

For example, in case of the magnetic disk device having a 95 mm diameter magnetic disk, of which spindle rotational speed is 7200 rpm, adequate depth of d3 is 1 $\mu$m to 2.5 $\mu$m.

Figure 10:
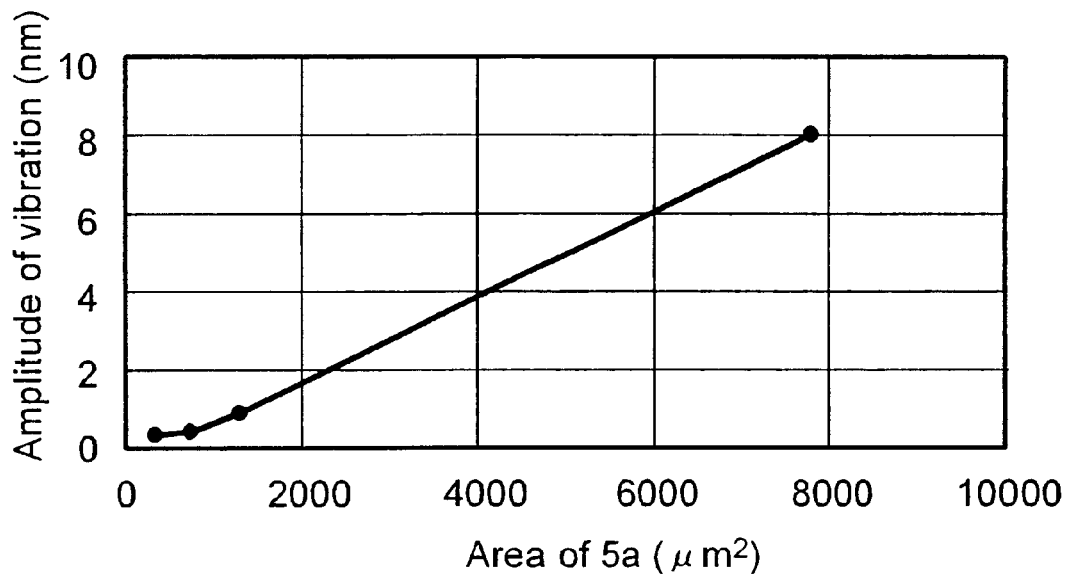
FIG. 10 is a diagram showing the relation between the area of the first surface constituting element 5a of the magnetic head slider of the first preferred embodiment of the present invention, and the amplitude of vibration.

FIG. 10 is a diagram showing the relation between the area of the first surface constituting element 5a of the magnetic head slider 1 and the vibration amplitude.

It shows that the vibration amplitude increases unilaterally with the increase of the area of the first surface constituting element 5a.

Therefore, the area of the first surface constituting element 5a, which is the contacting surface with the magnetic disk, must be as small as possible.

For example, to limit the vibration amplitude to 1 $\mu$m or less, the area of the first surface constituting element 5a is desirable to be 1000 $\mu$m2 or less.

In the preferred embodiment of the present invention, the magnetic head slider comprises substantially parallel four surfaces and when the surfaces are sequentially named from the surface nearest to the magnetic disk as a first surface, a second surface, a third surface and fourth surface in a state the magnetic head slider faces the magnetic disk, the magnetic head slider is constituted in such a way that S1>S2>S3>S4, while the total area of the magnetic head slider existing inside the first surface is S1, the total area of the magnetic head slider existing inside the second surface is S2, the total area of the magnetic head slider existing inside the third surface is S3 and the total area of the magnetic head slider existing inside the fourth surface is S4.

Figure 11:
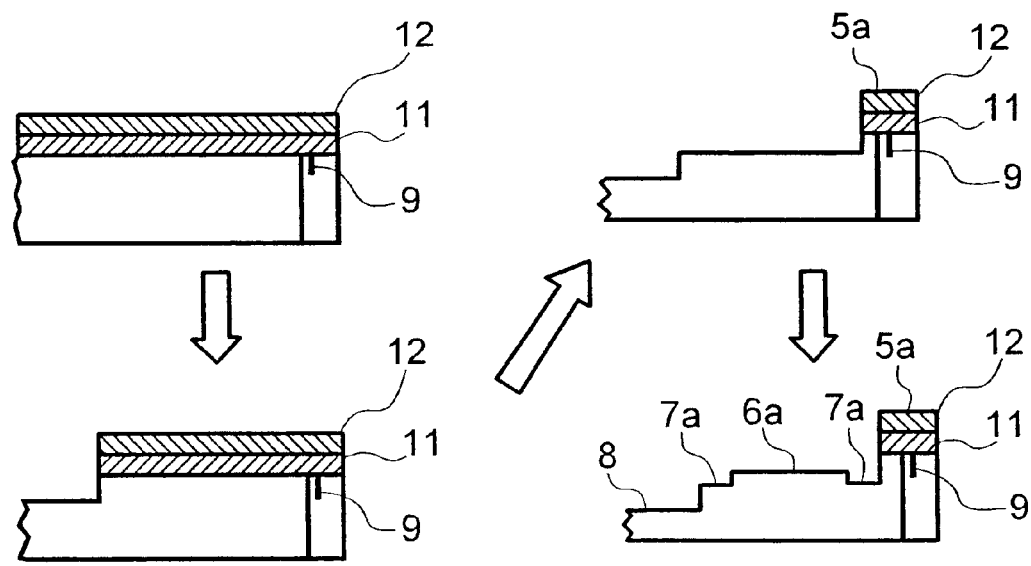
FIG. 11 is drawings illustrating an example of the process of producing a magnetic head slider of the first preferred embodiment of the present invention.

FIG. 11 shows an example of the process of producing the magnetic head slider of the present invention. Currently, as the base material of the magnetic head slider, sintered material of such as, AlTiC is generally used.

As a surface finally facing the magnetic disk, a carbon protecting film layer 12 for the main purpose of preventing the corrosion of magnetic head 9 is formed on a silicon layer 11, which is an adhesive layer.

In the preferred embodiment of the present invention, the desired shape is formed by repeating Ar ion milling for three times as is shown by FIG. 11.

At the final step, the silicon adhesive layer 11 and the carbon protective layer 12 remain only on the first surface constituting element 5a, which is mounted with the magnetic head, and on the first surface constituting elements 5b and 5c.

In the preferred embodiment of the present invention, the Ar ion milling is used as the method of processing, but the essential part of the present invention is not the method of processing and therefore, the shape can be formed with any kinds of processing method.

Figure 12:
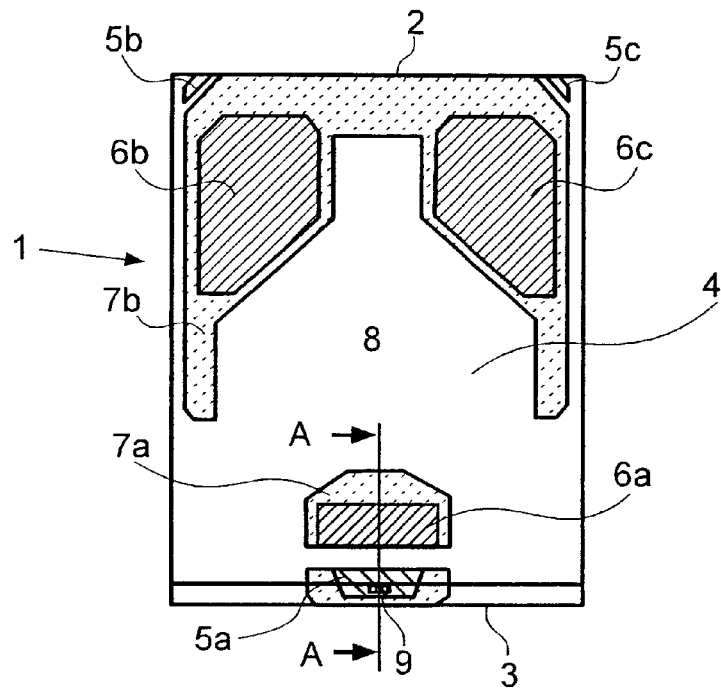
FIG. 12 is a drawing showing the top view of the magnetic head slider of the second preferred embodiment of the present invention.
Figure 13:
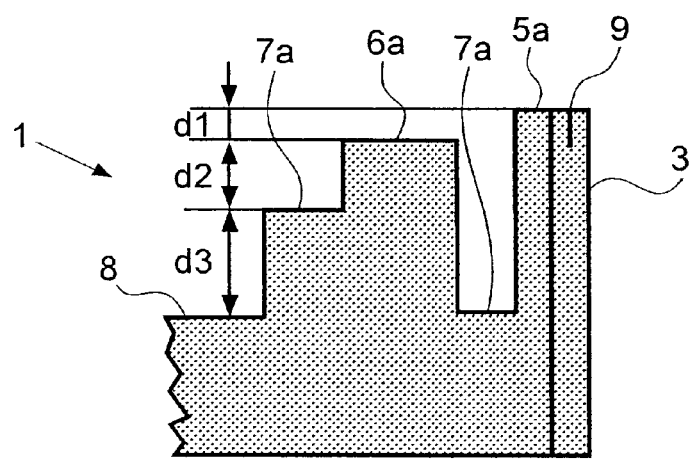
FIG. 13 is a drawing showing A—A cross section in the direction of arrows in the FIG. 13.

FIG. 12 is a top view of the magnetic head slider of the second preferred embodiment of the present invention, and FIG. 13 is a A—A cross section viewed in the direction of arrows in FIG. 12.

The difference of the magnetic head slider 1 of the second preferred embodiment of the present invention from the magnetic head slider of the first preferred embodiment of the present invention is that the flow-in edge side of the first surface constituting element 5a and the flow-out edge side of the first surface constituting elements 5b and 5c are at the same depth with the fourth surface constituting element 8.

By this preferred embodiment of the present invention, as there is not the third surface constituting element 7a which is connected to the first surface constituting element 5a, the floating force generated by the first surface constituting element 5a can be decreased more than that of the first preferred embodiment of the present invention.

Figure 14:
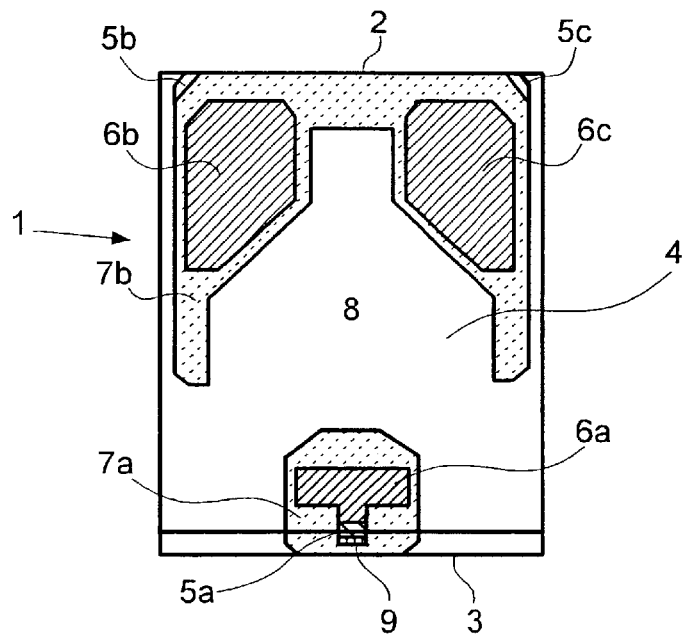
FIG. 14 is a drawing showing the top view of the magnetic head slide of the third preferred embodiment of the present invention.

FIG. 14 is a top view of the magnetic head slider of the third preferred embodiment of the present invention.

The first surface constituting element 5a and the second surface constituting element 6a of the magnetic head slider of the third preferred embodiment of the present invention are not separated by the third surface constituting element 7a but formed continuously. The area of the first surface constituting element 5a is made smaller to the extent the size of the magnetic head 9 allows.

Figure 15:
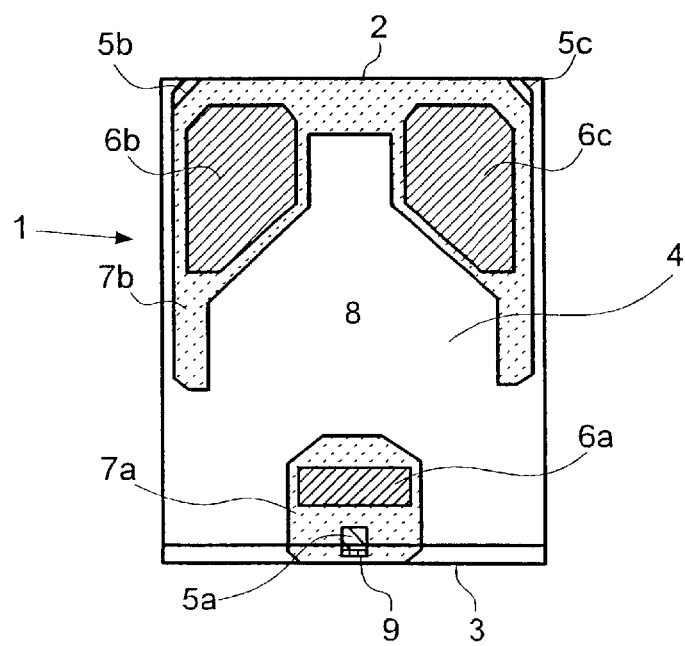
FIG. 15 is a drawing showing the top view of the magnetic head slider of the fourth preferred embodiment of the present invention.

FIG. 15 is a top view of the magnetic head slider of the fourth preferred embodiment of the present invention.

Similarly to the third preferred embodiment of the present invention, the size of the first surface constituting element 5a is made as small as possible, and the third surface constituting element 7a separates between the first surface constituting element 5a and the second surface constituting element 6a.

Figure 16:
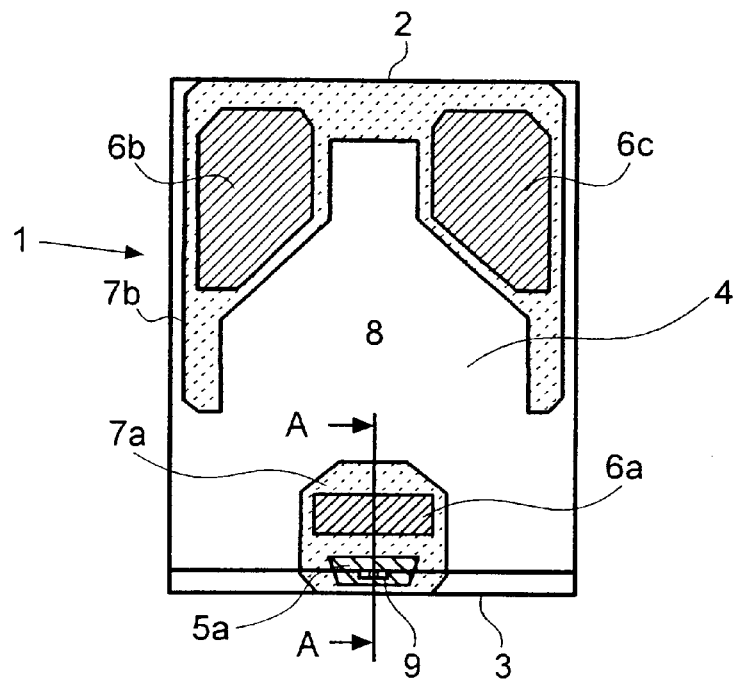
FIG. 16 is a drawing showing the top view of the magnetic head slider of the fifth preferred embodiment of the present invention.

FIG. 16 is a top view of the magnetic head slider of the fifth preferred embodiment of the present invention. The shape of the magnetic head slider of the fifth preferred embodiment of the present invention is similar to that of the first preferred embodiment of the present invention but removed with the first surface constituting elements 5b and 5c positioned on the side of air flows in.

While the magnetic head and the magnetic disk perform the recording and the reproduction in contact, the first surface constituting elements 5b and 5c are floating apart on the magnetic head and these surfaces are not related to the essence of the present invention.

Figure 17:
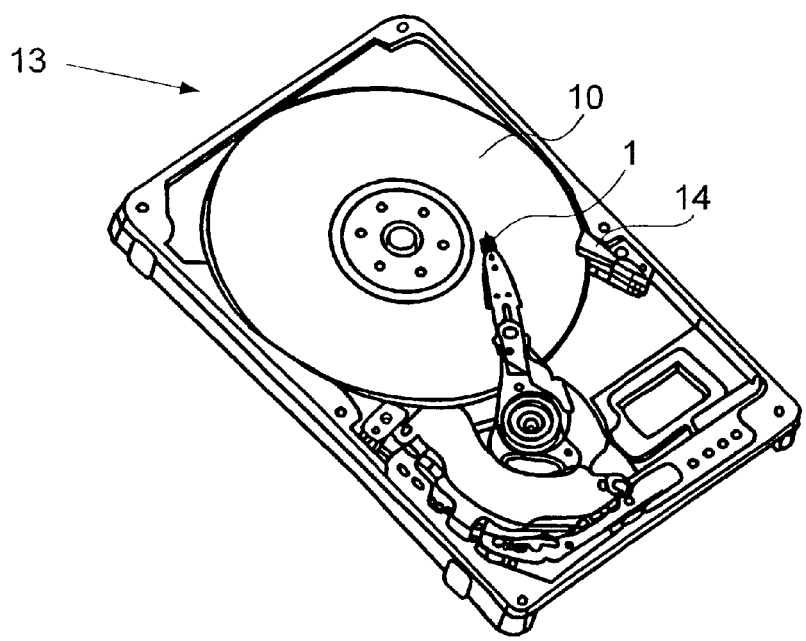
FIG. 17 is a figure illustrating a magnetic disk device mounted with a load/unload mechanism provided with the magnetic head slider of the present invention.

FIG. 17 is a figure of the magnetic disk device 13 mounted with the magnetic head slider, which are disclosed by the first to fifth preferred embodiment of the present invention.

This magnetic disk device is provided with a load/unload mechanism and the magnetic head slider 1 stands by on a ramp 14 while the magnetic disk device is stopped.

Only while the magnetic disk device is in operation, the magnetic head slider is loaded on the magnetic disk 10 and the recording or the reproduction is executed.

Using the magnetic head slider of this preferred embodiment of the present invention, the vibration of the magnetic head slider is not amplified by the contact with the magnetic disk while the recording or the reproduction, and stable recording or reproduction can be continued for a long time.

Figure 18:
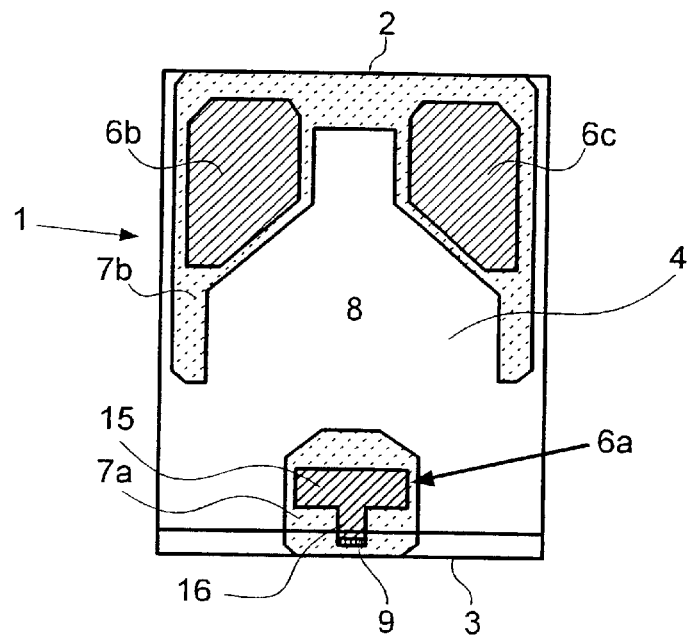
FIG. 18 is a drawing showing the top view of the magnetic head slider of the sixth preferred embodiment of the present invention.

FIG. 18 is a top view of the magnetic head slider of the sixth preferred embodiment of the present invention.

The floating surface of the magnetic head slider of the first to fifth preferred embodiment of the present invention comprises substantially parallel four surfaces but the floating surface of the magnetic head slider of the sixth preferred embodiment of the present invention comprises substantially parallel three surfaces.

That is, the magnetic head slider comprises 6a, 6b and 6c which are rail surfaces, 7a and 7b which are step air bearing surfaces, and 8 which is a recess for generating sub-ambient pressure force.

The feature of the sixth preferred embodiment of the present invention is that the rail surface 6a is formed T shape by the combination of a long sideway rail part 15 which is long in the crosswise direction of the slider and a lengthwise rail part 16 which is long in the direction of the length.

By such configuration, the long sideway rail part 15, being formed continuously from the step air bearing 7a, generates floating force and floats on the magnetic disk 10.

On the other hand, as the lengthwise rail part 16 is narrow and cannot generate enough floating force, the flow-out edge and vicinity of the lengthwise rail part mounted with the magnetic head 9 contacts the magnetic disk.

Furthermore, the area of the lengthwise rail part is narrow so that the vibration amplitude at the contact with the magnetic disk can be kept smaller.

The contacting part of the magnetic head slider of this preferred embodiment of the present invention is not separated three dimensionally compared with those of the first to fifth preferred embodiment of the present invention, and if the vibration amplitude is happened to be enlarged, there is a possibility the danger of contacting the long sideways rail part 15 with the magnetic disk.

However, there is a merit that the ion milling steps can be saved by one step compared to those of the first to second preferred embodiment of the present invention as the long sideways rail part 15 and the lengthwise rail part 16 are on a same plane.

The center rail shape of the magnetic head slider of the sixth preferred embodiment of the present invention can be formed by not only the ion milling process but by the Focus Ion Beam (FIB) process.

The FIB process is frequently used for forming the track width of the magnetic head in high precision.

The lengthwise rail part 16 of the sixth preferred embodiment of the present invention can also be formed by forming the flow-out edge side of the rail surface 6a at the forming of the track width.

In this case, a step difference, of which depth is different from that of the step air bearing 7a formed by the ion milling, is formed around the lengthwise rail part 16.

Figure 19:
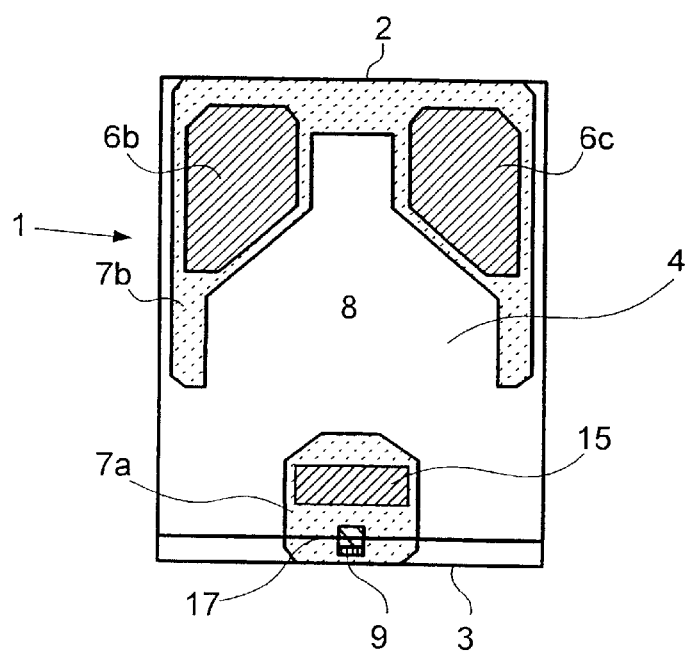
FIG. 19 is a drawing showing the top view of the magnetic head slider of the seventh preferred embodiment of the present invention.

FIG. 19 is a top view of the magnetic head slider of the seventh preferred embodiment of the present invention.

The floating surface 4 of the magnetic head slider of the seventh preferred embodiment of the present invention comprises three substantially parallel surfaces similarly to that of the sixth preferred embodiment of the present invention.

However, different from the case with the sixth preferred embodiment of the present invention, the step air bearing 7a separates between the long sideways rail part 15 and a contact pad 17.

Both with the sixth and seventh preferred embodiment of the present invention, it is important for decreasing the vibration amplitude that the area of the rail part near the element part contacting with the magnetic disk comprising the lengthwise rail part 16 and the contact pad 17 is narrower than the area of the long sideways rail part 15 which generates the floating force.

Figure 20:
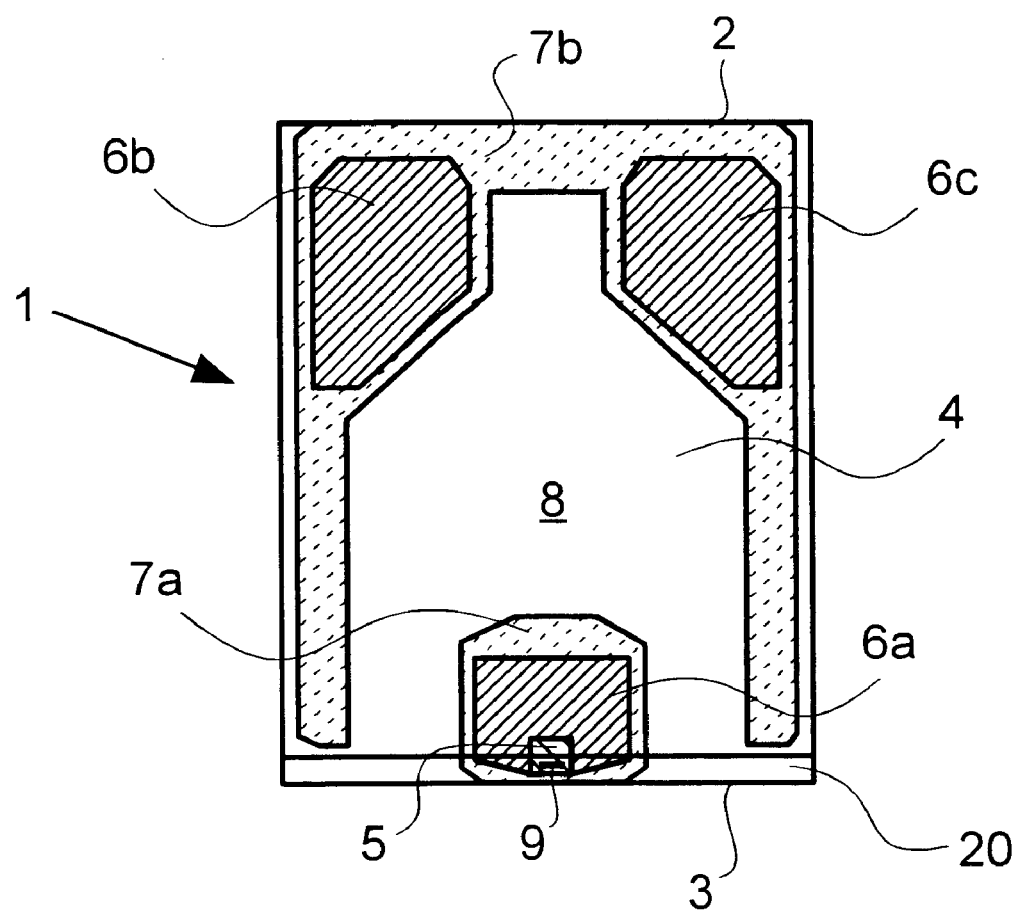
FIG. 20 is a drawing illustrating a manufacturing step of the magnetic head slider in the eighth preferred embodiment of the present invention.
Figure 21:
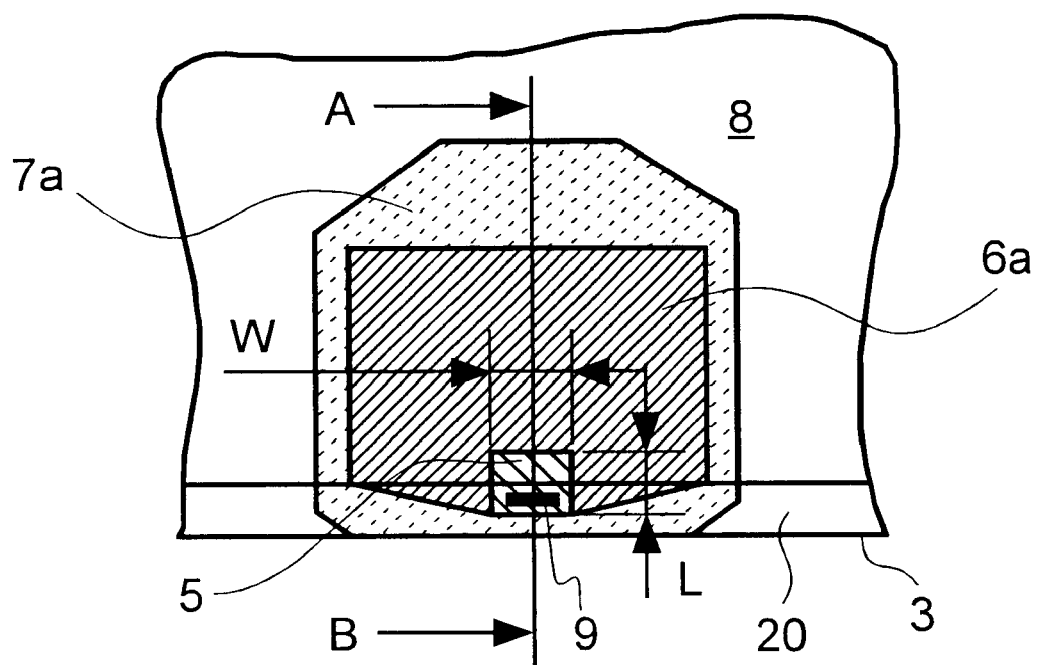
FIG. 21 is an enlarged drawing of the center rail portion of the magnetic head slider in the eighth preferred embodiment of the present invention.
Figure 22:
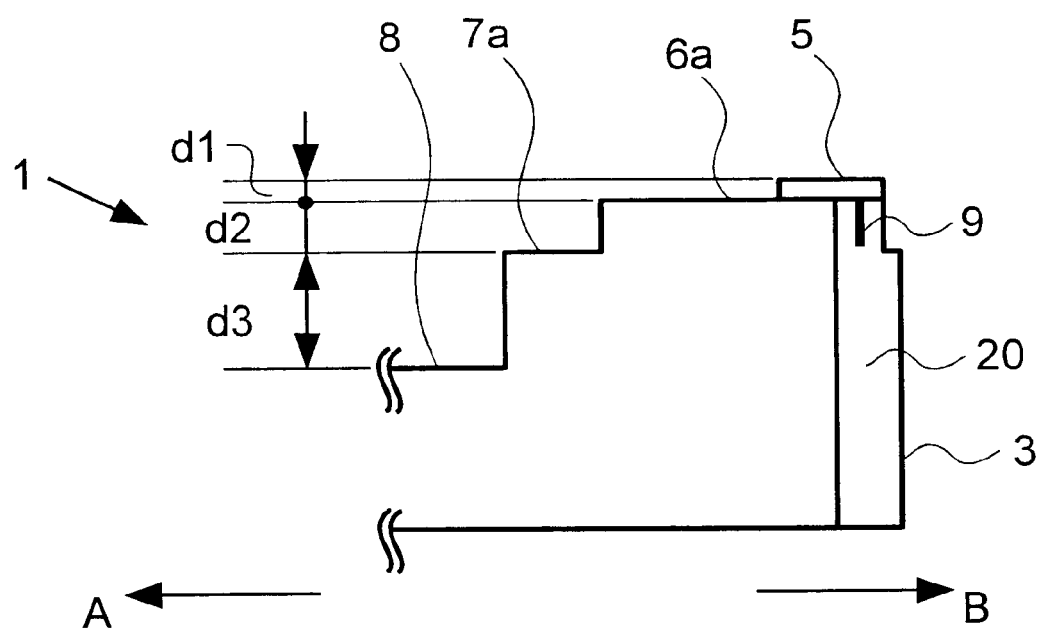
FIG. 22 is a cross-sectional view taken along line A–B of FIG. 21.

FIG. 20 is a top view illustrating an eighth embodiment of a magnetic head slider according to the present invention, FIG. 22 is an enlarged view of a center rail shown in FIG. 20, and FIG. 22 is a cross sectional view taken along line A–B in FIG. 21.

A first surface constituting element 5 is provided with a magnetic head 9. In this embodiment, a face having the magnetic head 9 is defined as a first surface. However, a protrusion surface may be formed, for example, on the side nearer to the magnetic disk than the first surface with an aim of reducing adhesion in a case of contact stop on a magnetic disk.

The basic material for the magnetic head slider 1 is alumina-titanium-carbide, and the magnetic head 9 is formed in an alumina film 20. The alumina film 20 is formed by a sputtering process. In addition to alumina-titanium-carbide, silicon carbide may also be used.

The first to a fourth surface are substantially flat surfaces in parallel with each other and a depth d1 from the first surface constituting element 6 to a second surface constituting element 6a is 5 nm, a depth d2 from the second surface constituting element 6a to a third surface constituting element 7a is 150 nm, and a depth d3 from the second surface constituting element 6a to a fourth surface constituting element 8 is 850 nm.

The second surface constituting element 6a is formed so as to be in contact with the air flow-in side and both sides of the first surface constituting element 5 and further extended to the air flow-in side. With such a constitution, the performance of the magnetic head slider 1 approaching the magnetic disk can be improved. This is because the run out trackability is improved.

For the long undulation such as disk run-out due to distortion caused by the clamping force of the magnetic disk, it is necessary to improve the air film rigidity of the magnetic head slider and, since the rigidity in the pitch direction of the air film can be improved when the second surface constituting element 6a extends to the flow-out side as in the eighth embodiment, the run-out trackability can be improved.

Further, the first surface constituting element 5 is reduced in the size as 60 μm in width W and 50 μm in length L as compared with the existent magnetic head mounting surface. Thus, the approaching performance to the magnetic disk can be improved even when the magnetic head slider is tilted in the roll direction.

Figure 23A:
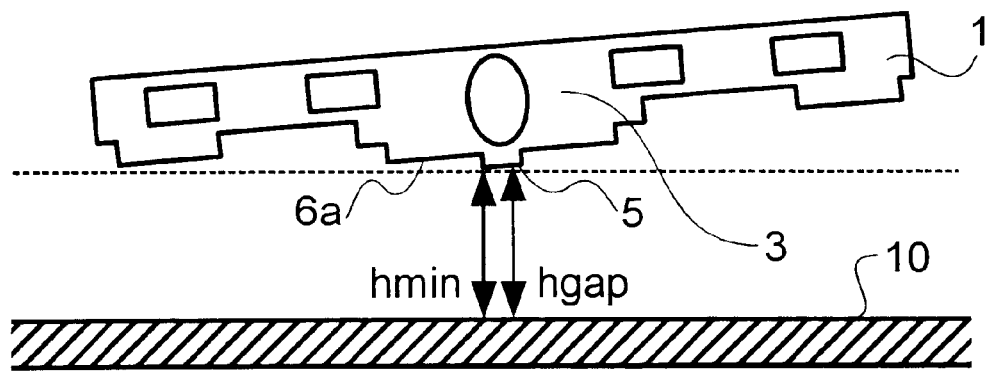
FIGS. 23A and 23B are diagrams showing the flying state of the magnetic head slider according to eighth embodiment of the present invention as viewed from the air flow-out side.
Figure 23B:
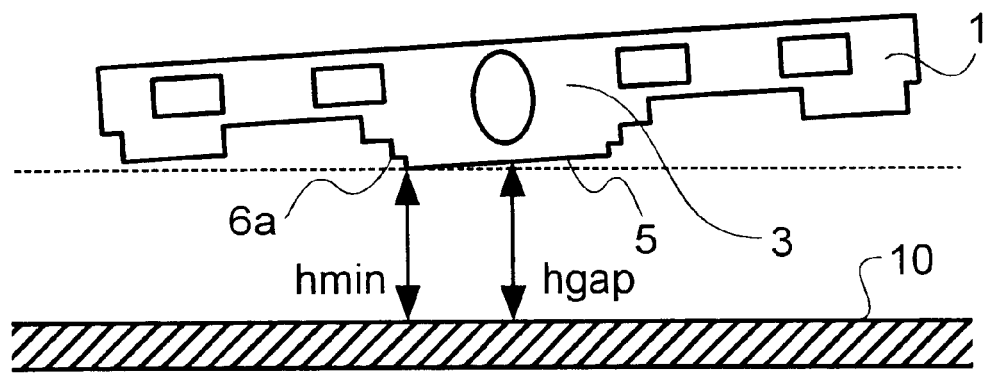

FIG. 23A is a view showing the state of the magnetic head slider of the eighth embodiment flying above the magnetic disk 10 on the side of the air flow-out end 3. FIG. 23B shows a case where the width W of the first surface constituting element 5 is large. When the width W is narrowed, the difference between the flying height hgap and the minimum flying height hmin at the position of the magnetic head 9 is decreased when the magnetic head slider is tilted in the roll direction and the approaching performance to the magnetic disk can be improved. While the depth D1 is as small as 5 nm, variations in the depth are ±1 nm or less.

A description will be made of a method of defining the depth from the first surface constituting element 5 to the second surface constituting element 6a to 10 nm or less and forming the same while suppressing the variations.

Figure 29:
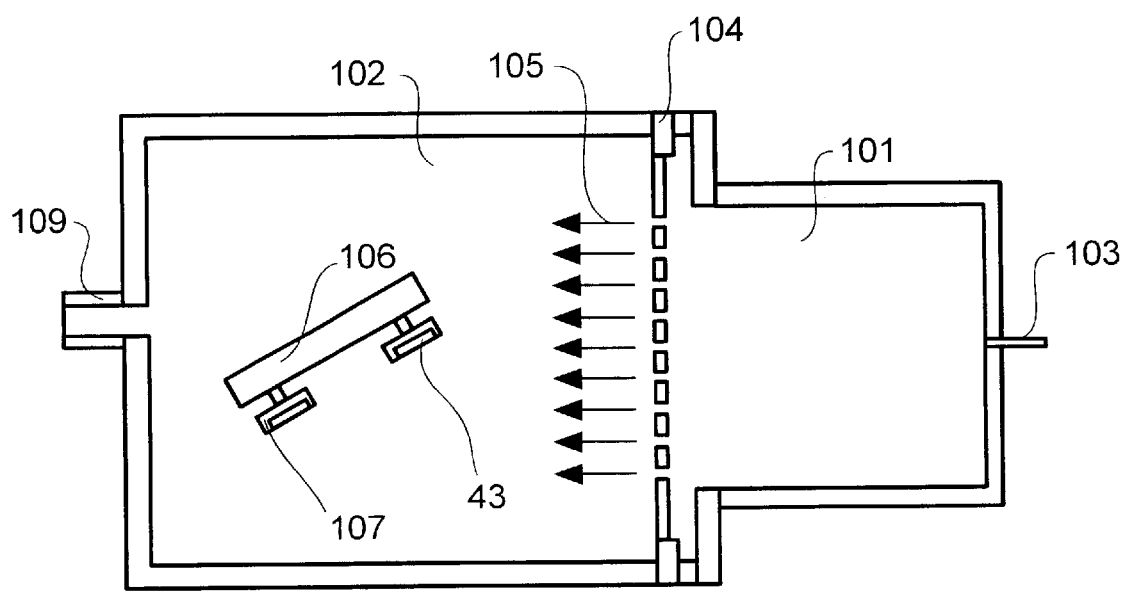
FIG. 29 is a schematic drawing of an ion milling device.

The fabrication for each of the surfaces has been conducted so far by using a ion milling apparatus shown in FIG. 29. An ion generation chamber 101 and a processing chamber 102 are evacuated by a vacuum pump (not illustrated) through a gas exhaust port 109. A gas such as Ar is introduced to the ion generation chamber 101 through a gas introduction port 103 and then ionized. Ionized particles are drawn out of a drawing electrode 104 to the processing chamber 102 and formed into an ion beam 105. A holder 107 is mounted on a stage 106 and, when an ion beam 105 is irradiated to a substrate 43 kept thereon, the flying surface of the magnetic head slider attached to the substrate 43 is fabricated by sputtering.

While the substrate 43 may be arranged so as to be vertical to the ion beam 105, it is generally fabricated being inclined as shown in FIG. 29 since re-deposits are deposited on the fabricated step. Further, the stage 106 and the holder 107 are made rotational so as to make the fabrication distribution uniform in the surface of the substrate 43.

Figure 30:
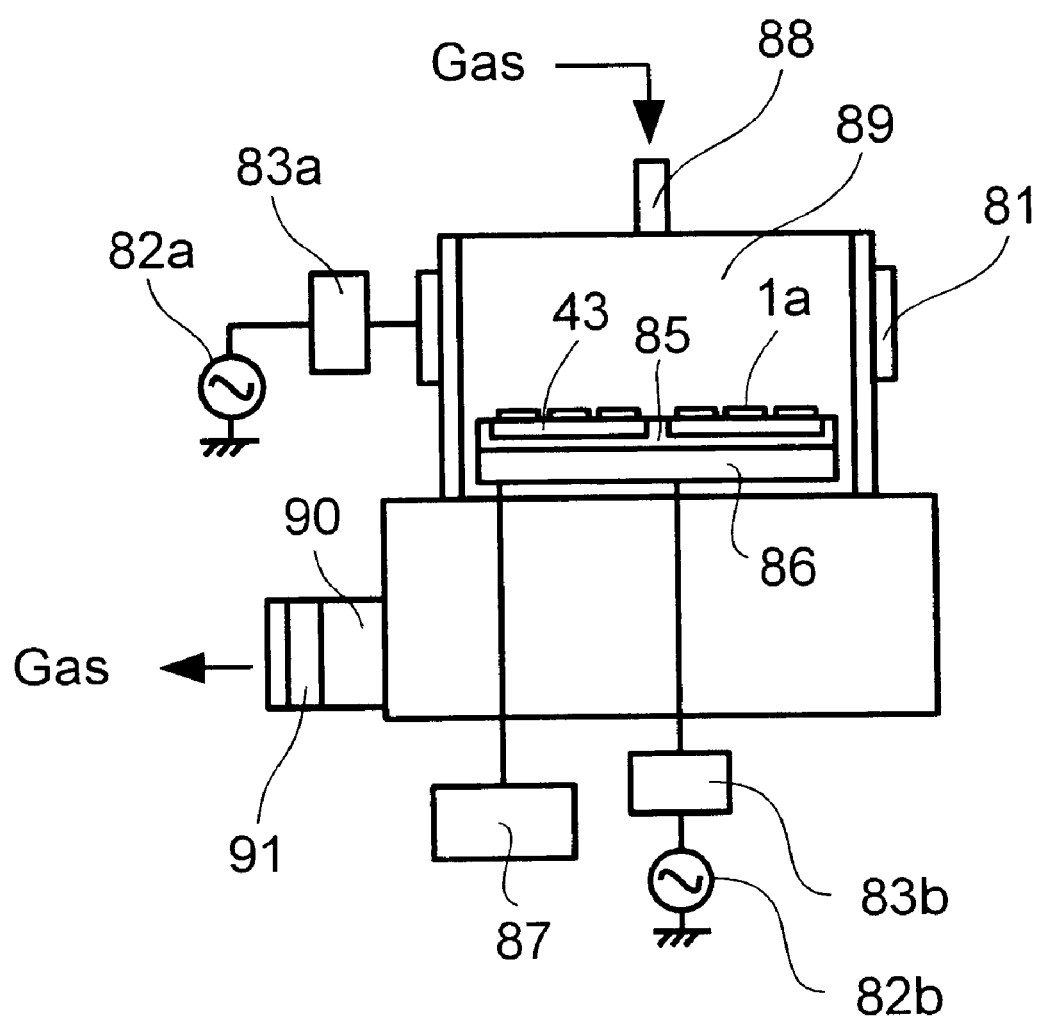
FIG. 30 is a drawing for illustrating the existent plasma processing method.

Fabrication conducted by using a plasma processing apparatus is shown in FIG. 30. The apparatus shown in FIG. 30 is an inductively coupled plasma etching apparatus in which plasma is generated by utilizing the energy of electromagnetic induction caused by supplying a radio frequency current from the radio frequency power source 82a to coils 81. A matching device 83a is provided between the high frequency power source 82a and the coils 81 so as not to form reflection power as less as possible. A high frequency power source 82b is connected to an electrode 86 mounting a plate 85 attached with a substrate 43 to apply a bias power.

A plurality of rectangular bars 1a comprising a plurality of magnetic head sliders adjacent to each other are bonded to the substrate 43. A matching device 83b is disposed between the electrode 86 and the radio frequency source 82b so as not to form the reflection power as less as possible. Coolant is circulated from a chiller 87 to the electrode 86 to cool the substrate 43. Further, a helium gas is introduced to the rear face of the substrate 43 by way of a not illustrated pipeline.

A gas to be converted into plasma is introduced from an introduction port 88 to the processing chamber 89 and then exhausted through an exhaust port 90. The processing chamber 89 is controlled to a constant pressure by a pressure controller 91 disposed in the midway of the exhaust port 90. As the gas, $CF_4$ containing fluorine atoms or a gas formed by mixing $C_4F_8$ and Ar or the like is used for instance.

Gas particles ionized by applying the bias power from the RF power source 82 are applied to the bars 1a thereby enabling anisotropic fabrication. Further, incidence of the ions can promote chemical reaction between the fluorine radicals and the surface of the bars 1a and high-speed etching can be conducted also by the simultaneously application of the sputtering effect.

By the way, since the depths d2 and d3 in FIG. 22 are 100 nm or more, it may suffice to attain a fabrication accuracy of about ±10 nm and fabrication can be conducted by the existent method. However, d1 is 10 nm or less and requires accuracy of ±1 nm or less and it has extremely been difficult to fabricate at this accuracy by the existent method. Naturally, when fabrication is repeated at several times, fabrication may sometimes be conducted at the accuracy within ±1 nm. However, this lowers the yield to bring about a problem in view of productivity. It is necessary that at least 60% or more of products be fabricated at the accuracy within a range ±1 nm, also including the distribution in the plane and inter batch distribution.

One of the reasons why fabrication cannot be carried out at accuracy of ±1 nm or less with good reproducibility is instability of the initial processing rate in the plasma etching apparatus. It takes several seconds of time from the application of the radio frequency power to the establishment of the matching by the matching device, and the instability of the processing rate during this period brings about a manufacturing variation of more than ±10 nm.

Further, in the ion milling apparatus, since sputtered particles are attached and deposited on the extraction electrode to fluctuate the processing rate and cause a variation of about ±4 nm, it is difficult to conduct fabrication with a good reproducibility at an accuracy of ±1 nm or less required for the fabrication of the flying surface of the magnetic head slider.

In this embodiment, to form the depth of 10 nm or less at accuracy of ±1 nm or less with a good reproducibility, use of a protective film comprising one or more of films formed in the magnetic head slider is noted. That is, it has been established a technique for depositing the protective film at accuracy of ±0.5 nm or less. Accordingly, d1 in FIG. 22 can be formed at accuracy of ±1 nm or less with good reproducibility by restricting damages to the lower layer of the alumina-titanium-carbide of the substrate or the protective film to 0.5 nm or less. That is, d1 is formed to a thickness of one or more of layers protective film. Apparently, d1 includes about 0.5 nm of injuries for the alumina-titanium-carbide as the substrate material or the lower layer of the protective film.

In this embodiment, a dual layered film having a silicon film and a DLC (Diamond Like Carbon) film are used for the protective film in which the DLC is formed on the silicon film. The silicon film has 2 nm in the film thickness and the DLC film has 3 nm. The protective film not only forms d1 but also serves to prevent corrosion of the magnetic head.

Then, a method of manufacturing a magnetic head slider according to the present invention will be described with reference to FIG. 24.

Figure 24A:
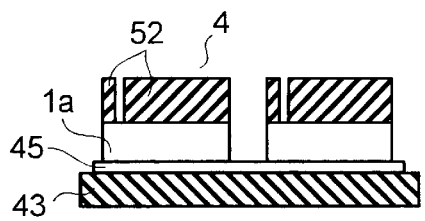
FIGS. 24A–24K are diagrams for illustrating manufacturing steps of a magnetic head slider in the eighth preferred embodiment of the present invention.

At first, bars 1a cut out of a base plate of alumina-titanium-carbide forming a magnetic head and polished at the cut surface and fabricated each into an appropriate device size are bonded collectively by plurality by way of an adhesion film 45 to a substrate 43 with the flying surface 4 being upside as shown in FIG. 24A. Then, a photoresist 52 is coated on the surface of the bars 1a and exposure and development are conducted to obtain a desired patterning.

Figure 24B:
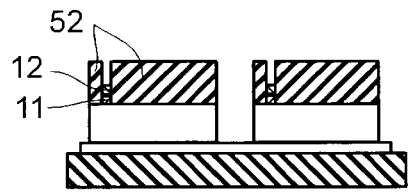

Then, as shown in FIG. 24B, a silicon film 11 is formed to 2 nm by a sputtering process and a DLC film 12 is formed to 3 nm by a CA-C (Cathode Arc-Carbon) process. The total of the film thickness is 5 nm and the accuracy is at ±0.5 nm or less.

Figure 24C:
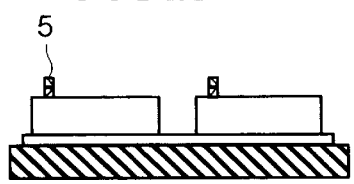

Then, the resist 52 is peeled by a peeling solution as shown in FIG. 24C. A portion of the protective film formed on the bar 1a constitutes a first surface constituting element 5. As the peeling solution, a neutral peeling solution at about pH 6 to 8 is used such that the etching amount of the alumina film 20 shown in FIG. 20 is 2 nm or less. While the resist 52 may be peeled also by an aqueous solution of sodium hydroxide, the etching amount of the alumina film 20 is as large as 10 nm or more.

When the alumina film 20 is etched, the depth between the surface of the first surface constituting element 5 and the alumina film 20 is larger than d1. When the depth d1 between the surface of the first surface constituting element 5 and alumina-titanium-carbide is kept at accuracy of ±1 nm relative to a designed value and the etching amount for the alumina film 20 is 10 nm or less, the magnetic head slider can be caused to fly stably.

However, when the etching amount increases to 10 nm or more, even if the depth d1 between the first surface constituting element 5 and alumina-titanium-carbide is kept at accuracy of ±1 nm, the magnetic head slider cannot be caused to fly stably, so that it is necessary that the etching amount is 10 nm or less in a state of completing the slider.

In this embodiment, to obtain four substantially parallel surfaces, patterning for the resist is required by three times. That is, the resist peeling has to be conducted also at three times. Then, it is necessary to restrict the etching amount per one step to about 2 nm or less.

Figure 24D:
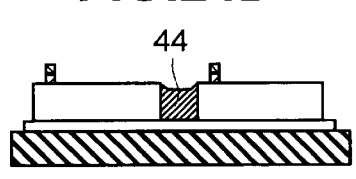

Then, a resin 44 is filled in the gap between the bars 1a as shown in FIG. 24D. The resin 44 is filled such that the lateral side does not suffer from injuries upon fabrication of the flying surface 4.

Figure 24E:
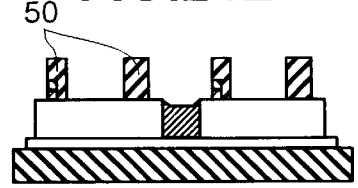
Figure 24F:
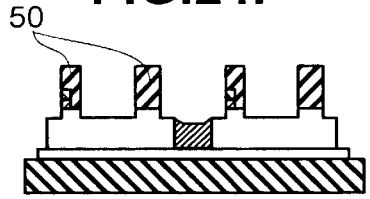

Then, as shown in FIG. 24E, a photoresist 50 is coated on the surface of the bars 1a as shown in FIG. 24E and exposure and development are conducted and a desired patterning is applied. Then, as shown in FIG. 24F, the surface of the bars 1a is fabricated by the ion milling apparatus.

Figure 24G:
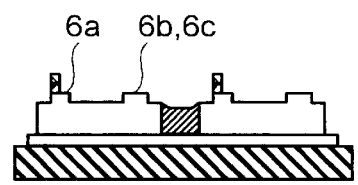

Then, as shown in FIG. 24G, the photoresist 50 is peeled by a peeling solution. In this step, the resin 44 is also removed by the peeling solution. Naturally, only the photoresist can be removed depending on the kind of the resin 44 or the peeling solution. Also in this case, a neutral peeling solution at about pH of 6 to 8 is used such that the etching amount for the alumina film 20 shown in FIG. 20 is 2 nm or less. Second surface constituting elements 6a, 6b, and 6c are formed on the bars 1a by the ion milling fabrication.

Figure 24H:
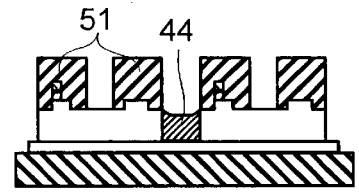

Then, as shown in FIG. 24H, after filling the resin 44 again, a photoresist 51 is coated on the bar 1a, exposure and development are applied and a desired patterning is applied.

Figure 24I:
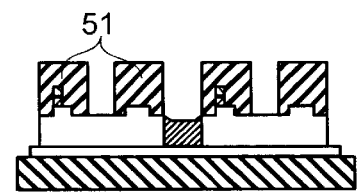

Then, as shown in FIG. 24I, the surfaces of bars 1a are fabricated by a reactive ion etching apparatus as shown in FIG. 24I.

Figure 24J:
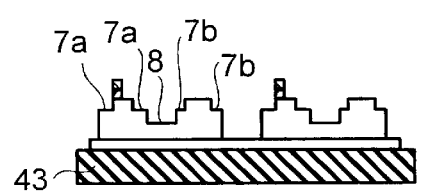

Then, as shown in FIG. 24J, the photoresist 51 is peeled by a peeling solution. In this step, the resin 44 is also removed by the peeling solution. Also in this case, a neutral peeling solution at a pH of about 6 to 8 is used such that the etching amount for the alumina film shown in FIG. 20 is 2 nm or less.

Figure 24K:
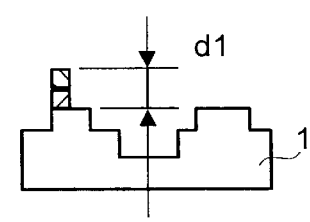

Third surface constituting elements 7a and 7b and a fourth surface constituting element 8 are formed on the bars 1a by reactive ion etching processing. Then, after peeling the bars 1a from the substrate 43 followed by cleaning, the bars 1a are cut to obtain final magnetic head sliders 1 as shown in FIG. 24K.

Also for the cleaning solution used for cleaning and a grinding solution used for cutting, a solution capable of restricting the etching amount for the alumina film 20 in FIG. 2 to 2 nm or less after cleaning or cutting is used. Thus, the etching amount of alumina in a state of completing magnetic head slider 1 can be reduced to 10 nm or less. Alumina is contained also in alumina-titanium-carbide as the substrate for the magnetic head slider.

However, the alumina-titanium-carbide 1 is prepared by a sintering method and alumina contained therein is dense and has higher etching resistance than alumina formed by a sputtering process by one digit or more. Accordingly, the etching amount of alumina in alumina-titanium-carbide is 1 nm or less even in a state of completing the magnetic head slider 1. Further, since titanium-carbide is not etched by the peeling solution or the like, the effect on the average depth is 0.5 nm or less. Accordingly, the depth of d1 can be at accuracy of ±1 nm or less for the designed value of 5 nm.

In this embodiment, d1 is defined as 5 nm, but it can be formed to a less depth, for example, 3 nm. In this case, d1 can be formed, for example, from the thickness of the two layers, that is, the silicon film to 1 nm and the DLC film to 2 nm in the same manner, it can be also formed only one layer of the DLC film. A manufacturing method for the magnetic head slider in this case is to be described with reference to FIG. 25.

Figure 25A:
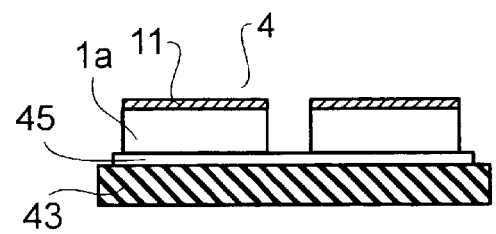
FIGS. 25A–25E are drawings for illustrating manufacturing steps of the magnetic head slider in the eighth preferred embodiment of the present invention.
Figure 25B:
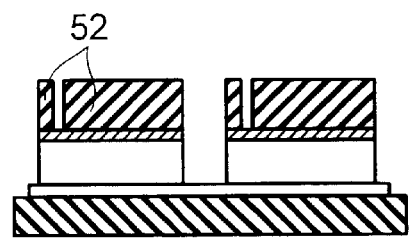

At first, as shown in FIG. 25A, bars 1a cut out of a alumina-titanium-carbide base plate forming a magnetic head, polished at the cut surface and fabricated into an appropriate device size are bonded collectively by plurality to a substrate 43 with the flying surface 4 being on the upside. Then, a silicon film 11 is formed to 2 nm over the entire surface of the bars 1a by a sputtering process. Then, as shown in FIG. 25B, a photoresist 52 is coated on the surface of the bars 1a, and exposure and development are applied and a desired patterning is applied.

Figure 25C:
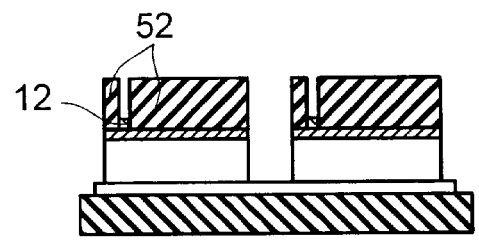
Figure 25D:
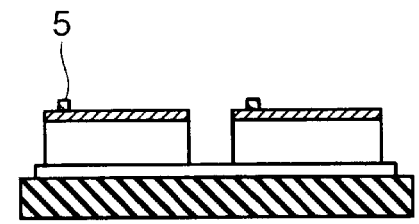

Then, as shown in FIG. 25C, a DLC film 12 is formed to 3 nm by a DA-C process. Then, as shown in FIG. 25D, the resist 52 is peeled by a peeling solution. The portion of the DLC film 12 formed on the bars 1a constitutes first surface constituting element 5.

Figure 25E:
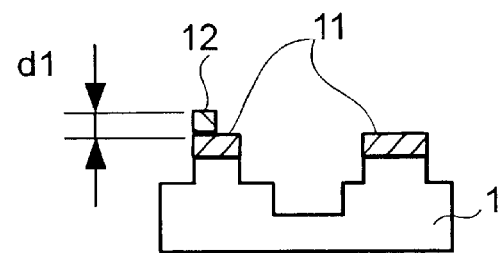

Then, after conducting the same procedures as those shown in FIG. 25D through J and peeling the bars 1a from the substrate 43, followed by cleaning, the bars 1a are cut to obtain a final magnetic head slider 1 as shown in FIG. 25E. Also in this case, the depth d1 can be formed at accuracy of ±1 nm or less.

A magnetic head slider can also be manufactured by still another method. The manufacturing method is to be described with reference FIG. 26.

Figure 26A:
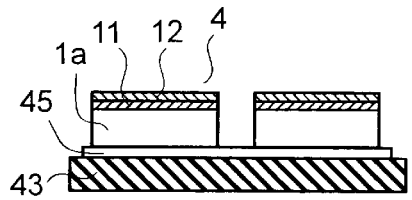
FIGS. 26A–26L are drawings for illustrating manufacturing steps of the magnetic head slider in the eighth preferred embodiment of the present invention.

At first, as shown in FIG. 26A, bars 1a cut out of an alumina-titanium-carbide base plate forming a magnetic head, polished at the cut surface and fabricating into an appropriate device size are bonded collectively by plurality by way of a bonding film 45 to a substrate 43 with a flying surface 4 being on the upside. Then, a silicon film 11 is formed to 2 nm by a sputtering process and a DLC film 12 is formed to 3 nm by a CA-C process. The total of the film thickness is 5 nm and the accuracy is ±0.5 nm or less.

Figure 26B:
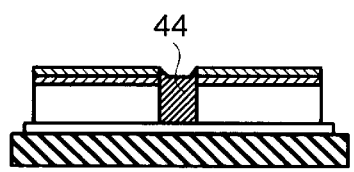
Figure 26C:
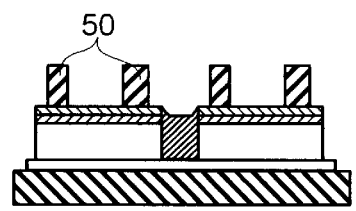

Then, as shown in FIG. 26B, a resin 44 is filled in a gap between the bars 1a. The resin 44 is used in order that the lateral side is not damaged upon fabrication of the flying surface 4. Then, as shown in FIG. 26C, a photoresist 50 is coated on the surface of the bars 1a, exposure and development are conducted and desired patterning is applied.

Figure 26D:
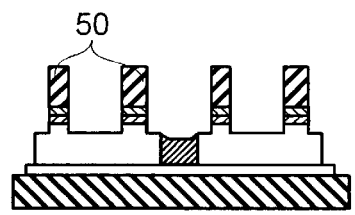
Figure 26E:
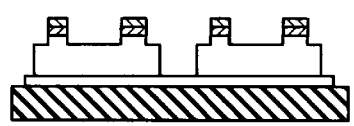

Then, as shown in FIG. 26D, the surfaces of the bars 1a are fabricated by an ion milling apparatus. Then, as shown in FIG. 26E, the photoresist 50 is peeled by a peeling solution. In this step, the resin 44 is also removed by the peeling solution. Naturally, only the photoresist 50 can be removed depending on the type of the resin 44 or the peeling solution. Also in this case, a neutral milling solution at a pH of about 6 to 8 is used such that the etching amount of the alumina film 20 shown in FIG. 20 is 2 nm or less.

Figure 26F:
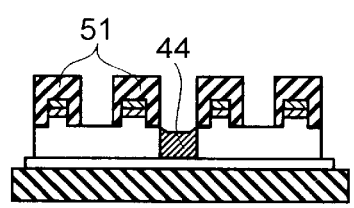

Then, as shown in FIG. 26F, after filling the resin 44 again, a photoresist 51 is coated over the bars 1a, exposure and development are conducted and a desired patterning is conducted.

Figure 26G:
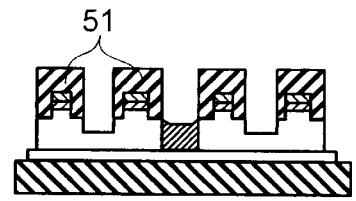

Then, as shown in FIG. 26G, the surface of the bars 1a is fabricated by a reactive ion etching apparatus.

Figure 26H:
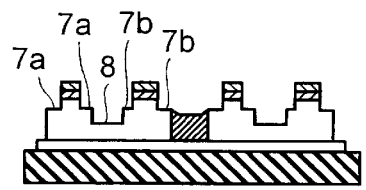

Then, as shown in FIG. 26H, the photoresist 51 is peeled by a peeling solution. In this step, the resin 44 is also removed by the etching solution. Also in this case, a neutral peeling solution at a pH of about 6 to 8 is used such that the etching amount of the alumina film 20 shown in FIG. 20 is 2 nm or less. Third surface constituting elements 7a and 7b and fourth surface constituting elements 8a are formed on the bars 1a by the reactive ion etching processing on the bars 1a.

Figure 26I:
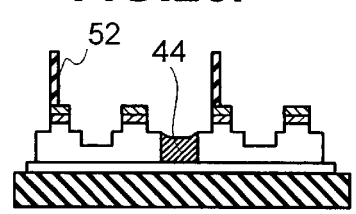
Figure 26J:
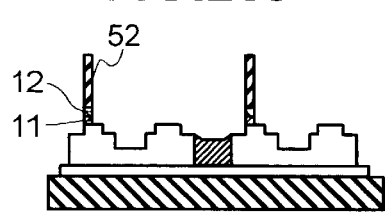

Then, as shown in FIG. 26I, after filling the resin 44 again, a photoresist 52 is coated on the bars 1a, exposure and development are conducted and a desired patterning is applied. Then, as shown in FIG. 26J, the DLC film 12 is removed by $O_2$ gas plasma and the silicon film 11 is removed by mixed gas plasma of $CF_4$ and $O_2$ and Ar. Details for the fabrication method will be described later.

Figure 26K:
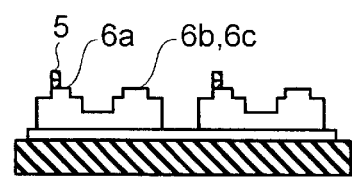

Then, as shown in FIG. 26K the photoresist 52 is peeled by a peeling solution. In this step, the resin 44 is also removed by the etching solution. Also in this case, a neutral peeling solution at a pH of about 6 to 8 is used such that the etching amount of the alumina film 20 shown in FIG. 20 is 2 nm or less. First surface constituting element 5 and second surface constituting elements 6a, 6b, 6c are formed on the bars 1a.

Figure 26L:
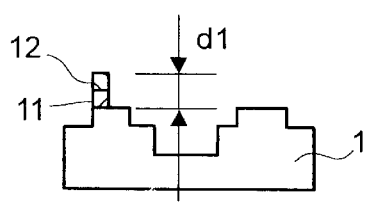

Further, after peeling the bars 1a from the substrate 43, followed by cleaning, the bars 1a are cut to obtain final magnetic head sliders 1 as shown in FIG. 26L.

d1 is constituted of the silicon film 11 and the DLC film 12 as the protective film and the depth is 5 nm±1 nm. Apparently, this is a value including about 0.5 nm of the injury to the alumina-titanium-carbide by the peeling solution or the like.

While d1 is set to 5 nm in the embodiment described above, a less depth, for example, 3 nm can also be formed. In this case, d1 may be formed, for example, for the thickness of the two layers with the silicon film of 1 nm and the DLC film of 2 nm in the same manner. However, it may also be formed to the thickness only for one layer of the DLC film. The method of manufacturing the magnetic head slider in this case is to be described with reference to FIG. 27.

Figure 27A:
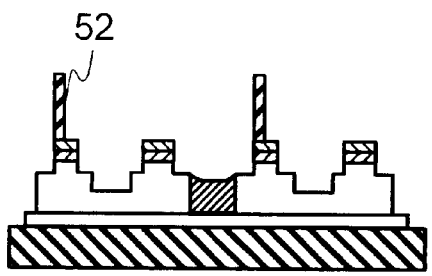

In the manufacturing method, the procedures are identical with those up to FIG. 27I, and FIG. 27A shows a situation after the method has proceeded up to FIG. 26I.

Figure 27B:
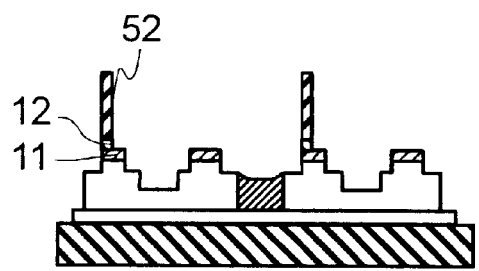
Figure 27C:
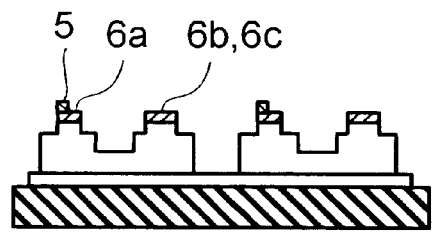

Then, as shown in FIG. 27B, the DLC film 12 is removed by $O_2$ gas plasma. Since the silicon film 11 is not removed by the $O_2$ gas plasma, it remains as it is. Then, as shown in FIG. 27C, the photoresist 52 is peeled by a peeling solution. First surface constituting element 5 and the second surface constituting elements 6a, 6b and 6c are formed on the bars 1a. The portions of the DLC film 12 formed on the bars 1a are the first surface constituting element 5.

Figure 27D:
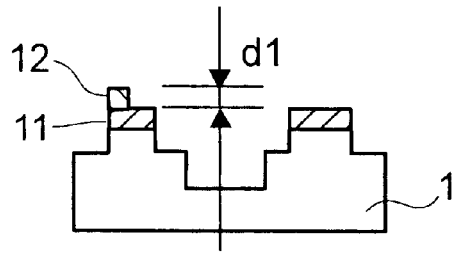

Then, after peeling the bars 1a from the substrate 43 followed by washing, the bars 1a are cut to obtain a final magnetic head slider 1 as shown in FIG. 27D.

When the DLC film 12 is removed, the silicon film 11 is expanded by oxidation. However, since the increase in the film thickness by the expansion is 0.5 nm or less, an accuracy of ±1 nm can be maintained.

A yet still another manufacturing method is shown in FIG. 28.

Figure 28A:
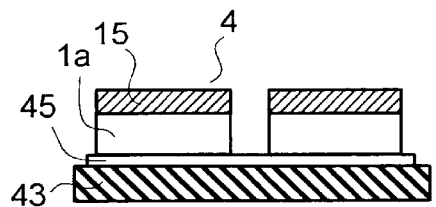

At first, as shown in FIG. 28A, bars 1a formed by cutting out of an alumina-titanium-carbide base plate that forms a magnetic head, polishing the cut surface and fabricating into an appropriate device size are bonded collectively by plurality on a substrate 43 by way of an adhesion film 45 with the flying surface 4a being upside. Then, a DLC film 15 is formed to 15 nm by a CA-C process.

Then, steps in FIG. 26B through FIG. 26H are conducted. FIG. 28B is a view showing the state where procedures have been conducted up to FIG. 26H in which third surface constituting elements 7a and 7b and a fourth surface constituting element 8 are formed. Then, as shown in FIG. 28C, the DLC film 15 is removed by $O_2$ gas plasma.

Figure 28F:
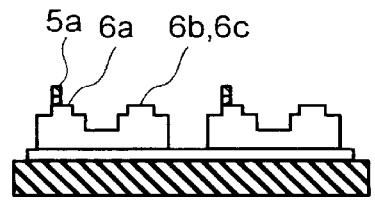
Figure 28B:
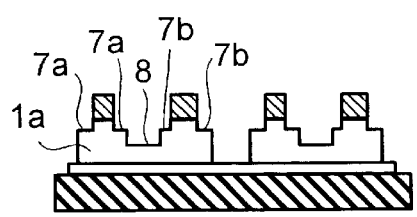
Figure 28G:
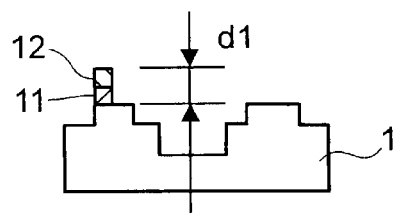
Figure 28C:
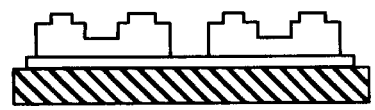
Figure 28D:
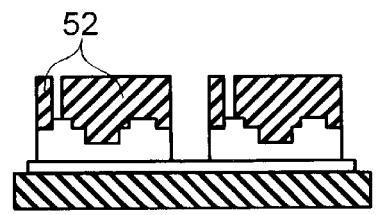
Figure 28E:
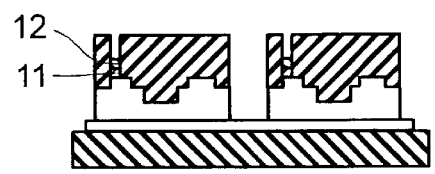

Then, as shown in FIG. 28D, a photoresist 52 is coated on the surface of the bars 1a, exposure and development are conducted and a desired patterning is applied. Then, as shown in FIG. 28E, a silicon film 11 is formed to 2 nm by a sputtering process, and a DLC film 12 is formed to 3 nm by a CA-C process. The total film thickness is 5 nm and accuracy is ±0.5.nm or less.

Then, as shown in FIG. 28F, the photoresist 52 is peeled by a peeling solution. A first constituting element and second constituting elements 6a, 6b, 6c are formed on the bars 1a. Then, after peeling the bar 1a from the substrate 43 followed by cleaning, the bars 1a are cut to obtain final magnetic head sliders 1 as shown in FIG. 28G.

d1 is constituted with the silicon film 11 and the DLC film 12 as the protective film and a depth is 5 nm±1 nm. Naturally, this is a value also including 0.5 nm for the injury caused to alumina-titanium-carbide by the peeling solution or the like.

When the protective film is formed in the latter stage as in this manufacturing method, it can provide a merit of reducing damages to the protective film caused by the heating or peeling solution. The initially formed DLC film 15 is for the protection of the magnetic head in the manufacturing steps.

Then, the fabrication method for the protective film is to be described in details.

Figure 32:
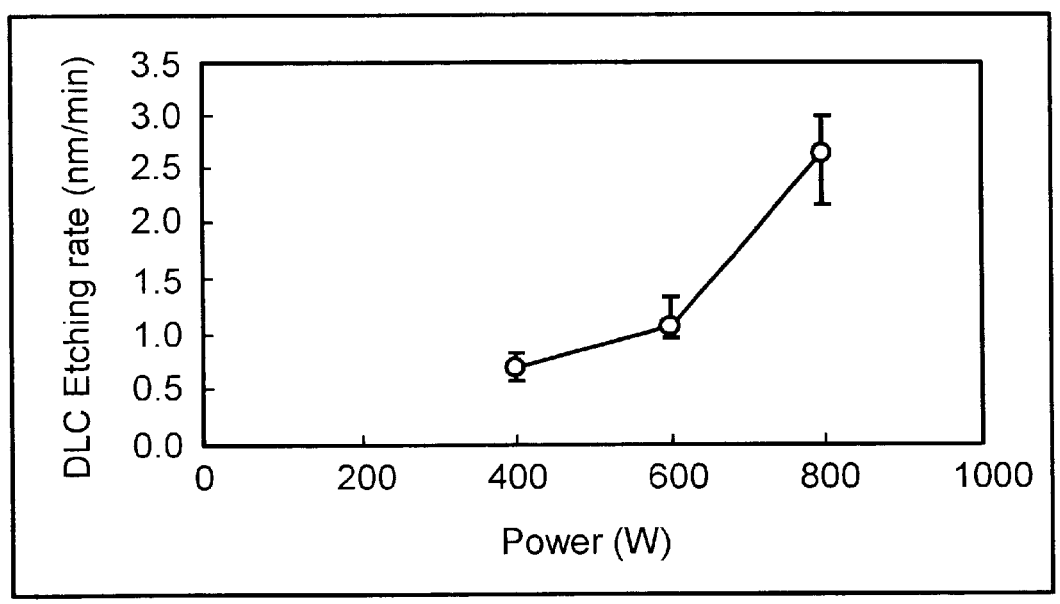
FIG. 32 is a drawing illustrating an example of etching for the DLC film in the eighth preferred embodiment of the present invention.

The protective film is fabricated by using an inductively coupled plasma processing apparatus exemplified in FIG. 32. Plasma is generated by utilizing the electro-magnetically induced energy formed by supplying radio frequency current to coils 81 disposed outside a processing chamber 89 from a radio frequency power source 82a by way of a matching device 83a. A gas is introduced from an introduction port 8 disposed on the upper side of the processing chamber 89 under control of the flow rate by a mass flow not illustrated and exhausted from an exhaust port 9 on the lower side by a not illustrated vacuum pump. A pressure controller 91 is disposed at the exhaust port 90, by which the pressure in the processing chamber 89 can be controlled uniformly.

Further, adjacent to the processing chamber 89, a load lock chamber 93 partitioned by a gate valve 92 is disposed. After attaching a substrate 43 appended with a plurality of bars 1a to a plate 85, plasma processing is conducted. A plurality of substrates 43 can be attached to the plate 85 and can be processed at a good productivity.

The plate 85 is at first placed on a transportation arm 94 of the load lock chamber 93 (at a position (a)). Then, after evacuating the load lock chamber 93 to a predetermined pressure, the plate is transported to the processing chamber 89 and mounted on the electrode 86 (at a position (b)). Then, it is transported to a position for plasma processing (at a position (c)).

To control the temperature of the substrate 43 and the bars 1a, temperature-controlled coolants are circulated from a chiller 87 to the electrode 86 to mount the plate 85. Further, the temperature for the substrate 43 and the bars 1a is controlled by introducing a helium gas by way of a not illustrated pipeline from a portion below the substrate 43.

A radio frequency power source 82b is connected to the electrode 86 by way of a matching device 83b by which a bias power can be applied. Usually, the bias power is applied from the radio frequency power source 82b to enter the ions on the surface of the bars 1a to conduct anisotropic processing and conduct etching at high speed by the interaction of the chemical reaction and sputtering.

However, in a case where physical sputtering effect is large, since it is difficult to provide selectivity in the processing depending on the material, a processing amount of ±0.5 nm or less can not be obtained at a good reproducibility for alumina-titanium-carbide as the base material of the magnetic head slider. On the other hand, when the sputtering effect is decreased and the chemical reaction is utilized positively, selectivity in the processing depending on the material can be increased. Accordingly, the film can be removed with the processing amount to alumina-titanium-carbide being reduced to ±0.5 nm or less at a good reproducibility. Then, the bias power is not applied from the radio frequency power source 82b.

Figure 33:
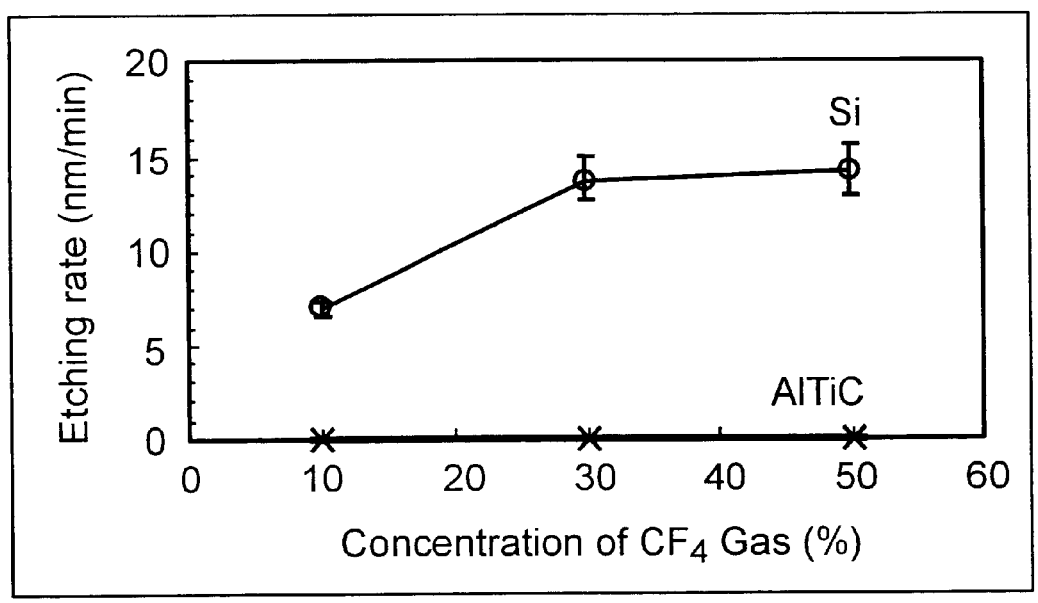
FIG. 33 is a drawing illustrating an etching example of the silicon film and AlTiC on the $CF_4$ gas concentration in the eighth preferred embodiment of the present invention.
Figure 34:
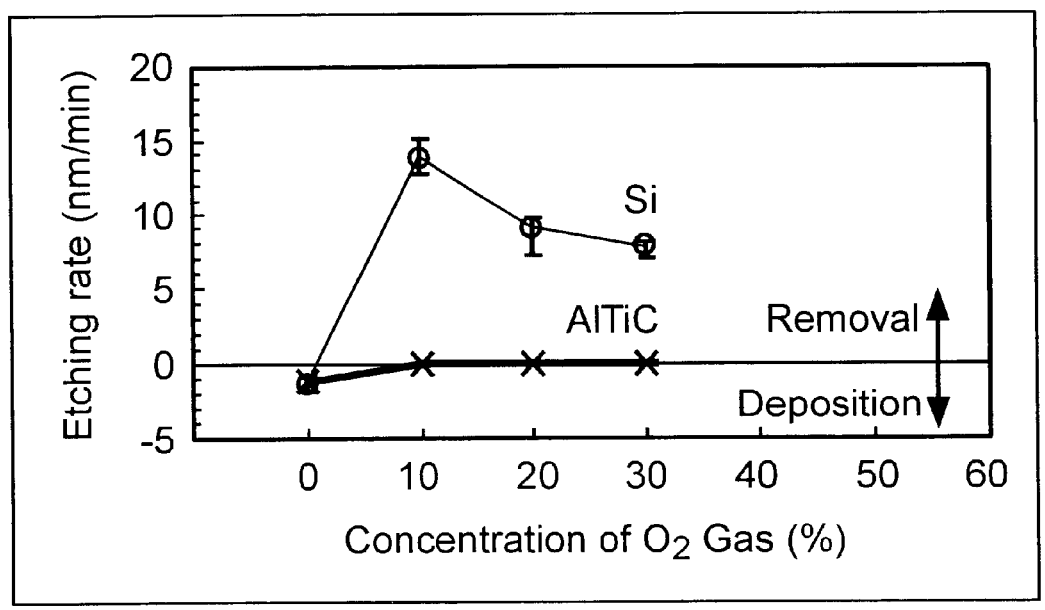
FIG. 34 is a drawing illustrating an etching example of the silicon film and AlTiC on the $O_2$ gas concentration in the eighth preferred embodiment of the present invention.

In this embodiment, since the protective film is formed of a 2-layered film, removal of the film is also conducted by two steps. FIG. 32 to FIG. 34 show examples of removing the film. In any of the cases, a processing amount is measured by a probe type step gage. FIG. 32 is an example of removing the DLC film by $O_2$ gas plasma in which abscissa denotes a radio frequency power to be charged to the coils and the ordinate denotes the etching rate for the DLC film. Other processing conditions are shown in Table 1. The DLC film can be removed by the $O_2$ gas plasma at a rate of 0.5 to 3.0 nm every one minute.

TABLE 1

| Processing Condition | |
| --- | --- |
| $O_2$ flow rate | 40 sccm |
| Pressure | 5.3 Pa |
| Bias power | none |
| Electrode temperature | 25° C. |

FIG. 33 and FIG. 34 are examples of removing the silicon film and alumina-titanium-carbide by plasma of mixed gas of $CF_4$, $O_2$ and Ar. FIG. 33 and FIG. 34 show the etching rate for the silicon film and an alumina-titanium-carbide in a case of changing the $CF_4$ concentration in FIG. 33 and the $O_2$ gas concentration in FIG. 34. Other processing conditions are shown in Table 2.

As a result, the silicon film can be removed at a rate of 5 to 10 nm/min by using plasma of the mixed gas of $CF_4$, $O_2$ and Ar. On the other hand, no step is measured on the silicon-carbide surface. This is because even when the surface is fluoridized or oxidized by the plasma of the mixed gas of $CF_4$, $O_2$ and Ar, the reaction products are less evaporative and less etched.

In view of the experimental results described above, the protective film comprising the silicon-DLC film formed on the surface of the substrate of the magnetic head slider can be removed with scarce effect on alumina-titanium-carbide.

At an $O_2$ concentration of 0%, etching is not conducted and reaction products are deposited. They are CF type polymer films. Since the CF type polymer films tend to be formed with a gas containing C atoms and F atoms in the molecule as described above, it is desirable to use plasma formed by mixing a gas containing O atoms in the molecule in order to remove them. Apparently, the silicon film can be removed with any gas not containing C atoms such as $SF_6$, without mixing a gas containing O atoms.

TABLE 2

| Processing Condition | |
| --- | --- |
| Total flow rate | 30 sccm |
| Pressure | 0.2 Pa |
| Bias power | none |
| Electrode temperature | 25° C. |

In this embodiment, the DLC film is removed by $O_2$ gas plasma and the silicon film is removed by plasma of the mixed gas of $CF_4$, $O_2$ and Ar based on the removing examples described above.

Figure 31:
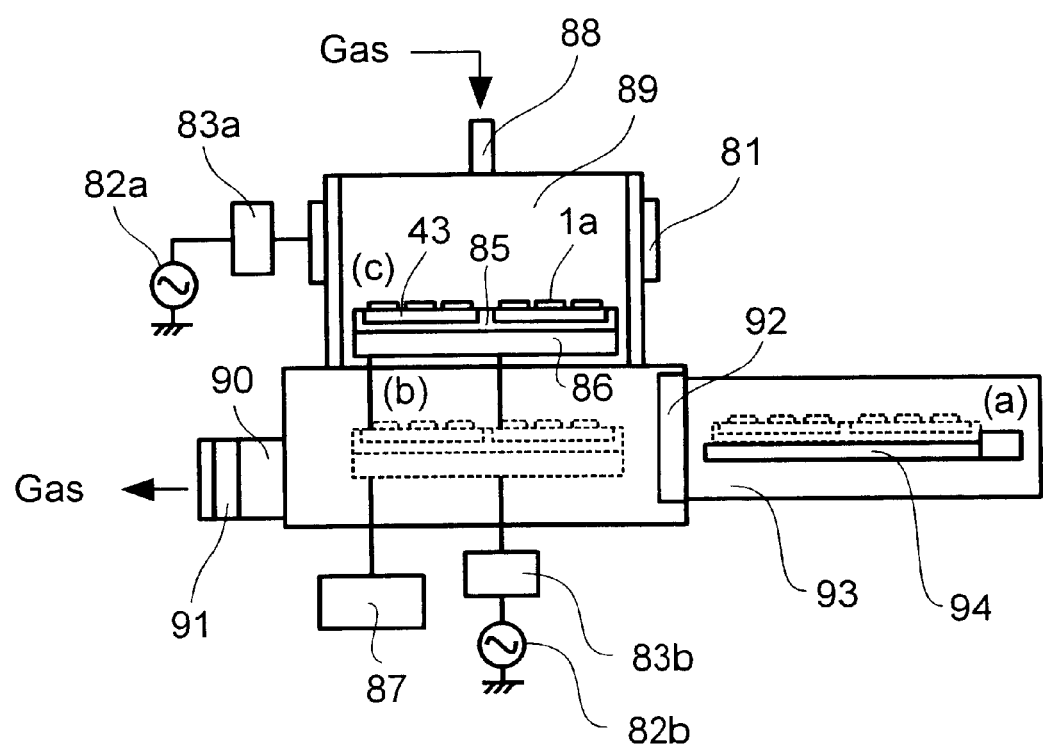
FIG. 31 is a drawing illustrating a plasma processing apparatus and processing method in the eighth preferred embodiment of the present invention.

Then, an example of the plasma processing method is to be described in details with reference to FIG. 31.

At first, a plurality of substrates 43 to which a plurality of bars 1a are bonded are attached to the plate 85. The silicon film is formed to 2 nm and the DLC film is formed to 3 nm, that is, 5 nm in total as the protective film on the bars 1a. A desired shape is patterned on them by a photoresist. After releasing the load lock chamber 93 to atmospheric air, the plate 85 is placed on the transportation arm 94 (at a position (a)), and the load lock chamber 93 is evacuated to a predetermined pressure. After the evacuation, the gate valve 92 is opened to transport the plate 85 and set it to the electrode 86 (at a position (b)).

The transportation arm 94 is returned to the load lock chamber 93 and the gate valve 92 is closed and, at the same time, the electrode 86 is raised to a predetermined position in the processing chamber 89 (at a position (c)). Coolants previously controlled to a temperature of 25° C. are circulated to the electrode 86 from the chiller 87. After evacuating the processing chamber 89 to a predetermined pressure, a helium gas is supplied at the back of the substrate 43 to control the temperature of the substrate 43.

Then, an $O_2$ gas controlled to a flow rate of 40 sccm is introduced from a not illustrated mass flow through an introduction port 88 and controlled to a pressure of 5.3 Pa by the pressure controller 91. After the pressure is stabilized, a power is applied by 800 W from the radio frequency source 82a by way of the matching device 83a to the coils 81 to generate plasma. In this case, the power from the radio frequency power source 82b is not applied to the electrode 86. By processing the bars 1a for 3 min in this state, the DLC film of 3 nm is removed.

After the processing, supply of the radio frequency power and the introduction of the gas are stopped and the inside of the chamber is evacuated down to a predetermined pressure. Then, a gas formed by controlling $CF_4$ to 9 sccm, $O_2$ to 3 sccm and Ar to 18 sccm from a plurality of not illustrated mass flow and mixing them is introduced through the introduction port 88, and controlled to a pressure of 0.2 Pa by the pressure controller 91. After the pressure is stabilized, power is applied by 400 W to the coils 1 from the radio frequency power source 82a via the matching device 83a to generate plasma. In this case, the power from the radio frequency power source 82b is not applied to the electrode 86. By processing the bars 1a for 1 min in this state, the silicon film of 2 nm is removed.

By conducting the processing in accordance with the process flow described above, the protective film (film thickness 5 nm) comprising the silicon-DLC film formed on alumina-titanium-carbide can be fabricated while restricting the fabrication amount for alumina-titanium-carbide to ±0.5 nm or less. In other words, the step from the first surface constituting element as the uppermost surface (surface of the protective film) in which the magnetic head is formed to the second surface constituting the element (alumina-titanium-carbide) can be formed with the thickness of the protective film, and can be formed with a good reproducibility at an accuracy of ±1 nm or less relative to the film thickness 5 nm thereof in the surface on the air flow-out side of the magnetic head slider.

Further, while the inductively coupled plasma processing apparatus is used for the plasma processing in this embodiment, it is not necessarily restricted only thereto but other type of apparatus, for example, a down flow type plasma processing apparatus may also be used. Further, in this embodiment, an identical apparatus is used for the removal of the DLC film and the silicon film, the DLC film and the silicon film may be removed by separate apparatus.

Further, the protective film is not restricted to the dual layer film of the silicon film and the DLC film of this embodiment but it may be formed only of the DLC film, or the silicon film, a silicon carbide film or a laminate film thereof may also be used. Further, while the DLC film is formed by the CA-C process, it may be formed by a CVD (Chemical Vapor Deposition) process or sputtering process. Alternatively, films of nitrogen-containing carbon or B—C—N may also be used. Silicon carbide or the like may also be used as the substrate material for the magnetic head slider not being restricted only to alumina-titanium-carbide. In any of the cases, effect similar to those in the embodiment described above can be provided.

As described above, the present invention have the effect of maintaining high reliability by equalizing the flying height over the whole surface of the magnetic disk and reducing the change of the flying height by the variation of processing, seek operation and operation at the high altitude, and having the magnetic head slide on the surface of the magnetic disk smoothly at the contact between the magnetic head and the magnetic disk.

Further, the present invention can provide the effect of forming even a depth as less as 10 nm or less at accuracy of ±1 nm with a good reproducibility and reducing the fluctuation in the flying amount due to variations in manufacturing.

What is claimed is:

1. A magnetic head slider comprising:

a first surface, a second surface, a third surface and a fourth surface substantially in parallel with each other formed sequentially from the surface nearer to a magnetic disk in which a gap of a magnetic head is defined in the first surface, wherein a relation of d1<d2<d3 is established where said d1 is a depth from said first surface to said second surface, said d2 is a depth from said second surface to said third surface, and said d3 is a depth from said third surface to said fourth surface, and the depth of said d1 has a thickness of one or more of layers of a protective film comprising one or more layer of films.

2. A magnetic head slider comprising:

a magnetic head mounting surface on which a magnetic head is disposed, a protective film comprising one or more layer of films at least formed on said magnetic head mounting surface, a slider rail surface formed on a surface on an air flow-in side and a surface on an air flow-out side and including at least two slider rails, a step air bearing surface, and a recess for generating sub-ambient pressure force which is formed between at least a portion of said at least two slider rails, wherein a relation of d1<d2<d3 is established, where said d1 is a depth from a surface of said protective film to said slider rail surface, said d2 is a depth from said slider rail surface to said step air bearing surface, and said d3 is a depth from step air bearing surface to a surface of said recess, and said depth d1 is equal to a thickness of said protective film.

3. A magnetic head slider as defined in claim 2, wherein said thickness of said protective film is 10 nm or less.

4. A magnetic head slider as defined in claim 2, wherein said protective film is a carbon film, silicon film, silicon carbide film, or a laminate film thereof.

5. A magnetic head slider as defined in claim 4, wherein said carbon film is a nitrogen-containing carbon film or a B—C—N film.

6. A magnetic head slider as defined in claim 2, wherein a base material forming at least one of said slider rail surface, said step air bearing surface and said recess is alumina-titanium-carbide or silicon carbide.

* * * * *